(12) United States Patent
Taylor et al.

(10) Patent No.: US 10,134,275 B2
(45) Date of Patent: Nov. 20, 2018

(54) MONITORING VEHICLE PARKING OCCUPANCY

(71) Applicant: PNI Sensor Corporation, Santa Rosa, CA (US)

(72) Inventors: Andrew T. Taylor, Santa Rosa, CA (US); Tyler Bryant, Santa Rosa, CA (US); Yuan Zou, Santa Rosa, CA (US); Byron Whitlock, Santa Rosa, CA (US); Joseph F. Miller, Santa Rosa, CA (US)

(73) Assignee: PNI Sensor, Santa Rosa, CA (US)

( * ) Notice: Subject to any disclaimer, the term of this patent is extended or adjusted under 35 U.S.C. 154(b) by 0 days.

(21) Appl. No.: 15/619,317

(22) Filed: Jun. 9, 2017

(65) Prior Publication Data

US 2018/0301027 A1 Oct. 18, 2018

Related U.S. Application Data

(63) Continuation-in-part of application No. 15/486,501, filed on Apr. 13, 2017.

(51) Int. Cl.
| | |
|---|---|
| *H03K 17/96* | (2006.01) |
| *G08G 1/042* | (2006.01) |
| *H04W 24/08* | (2009.01) |
| *H04L 29/08* | (2006.01) |

(52) U.S. Cl.
CPC ............ *G08G 1/042* (2013.01); *H04L 67/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 4,203,109 A | 5/1980 | Ballard et al. | |
| 5,239,264 A | 8/1993 | Hawks | |
| 8,749,231 B2 | 6/2014 | Taylor et al. | |
| 9,141,194 B1 | 9/2015 | Keyes et al. | |
| 2007/0064471 A1 | 3/2007 | Daily | |
| 2007/0225912 A1* | 9/2007 | Grush | G01C 21/20 |
| | | | 701/469 |
| 2016/0104486 A1* | 4/2016 | Penilla | H04L 67/12 |
| | | | 704/232 |
| 2016/0123770 A1 | 5/2016 | Feucht et al. | |

(Continued)

*Primary Examiner* — Lincoln Donovan
*Assistant Examiner* — Khareem E Almo
(74) *Attorney, Agent, or Firm* — Brian R. Short

(57) ABSTRACT

Apparatuses, methods and systems for monitoring vehicle parking occupancy are disclosed. One method includes intermittently receiving, by a wireless node, a wireless signal from a vehicle sensing device, wherein the vehicle sensing device transmits the wireless signal upon sensing a change in vehicle occupancy of an associated parking location, wherein the wireless signal includes a vehicle sensing indicator, wherein the vehicle sensing indicator indicates whether the vehicle sensing device senses vehicle occupancy of the associated parking location, measuring a signal quality of the intermittently received wireless signal over time, correlating the measured signal quality of the intermittently received wireless signal over time with the vehicle occupancy indictor, and identifying errors in the vehicle sensing indicator based on the correlating of the measured signal quality of the intermittently received wireless signal over time with the vehicle occupancy indictor.

20 Claims, 18 Drawing Sheets

(56) References Cited

U.S. PATENT DOCUMENTS

| | | |
|---|---|---|
| 2017/0103327 A1* | 4/2017 | Penilla .................. G06N 5/025 |
| 2017/0118307 A1* | 4/2017 | Beaurepaire ....... G01C 21/3685 |
| 2017/0124781 A1* | 5/2017 | Douillard ................. B60Q 1/26 |
| 2017/0289671 A1 | 10/2017 | Patel et al. |
| 2018/0101173 A1* | 4/2018 | Banerjee ............... B64C 39/024 |
| 2018/0122237 A1* | 5/2018 | Nascimento ..... G08G 1/096827 |
| 2018/0190046 A1* | 7/2018 | Levinson ............... G01C 25/00 |

* cited by examiner

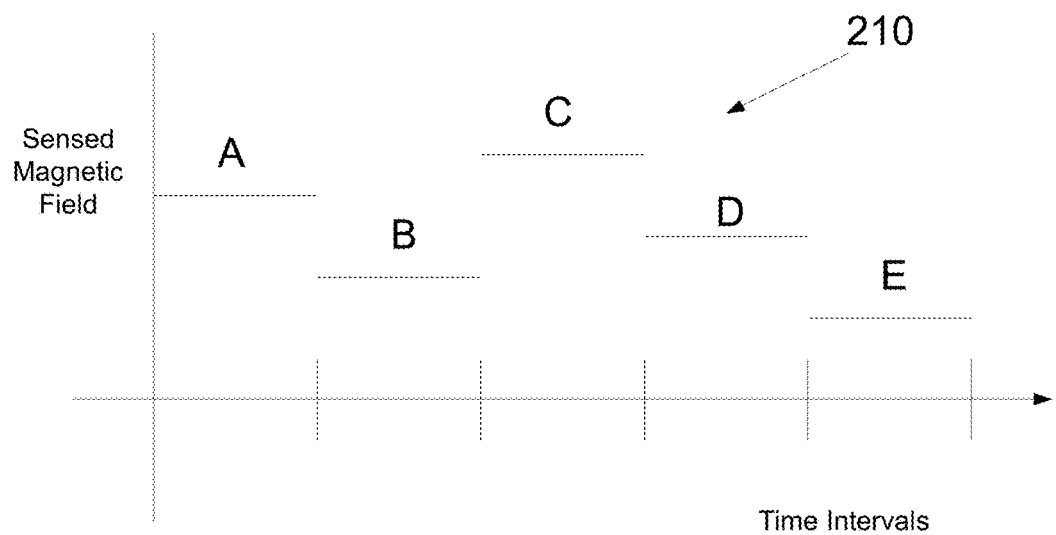
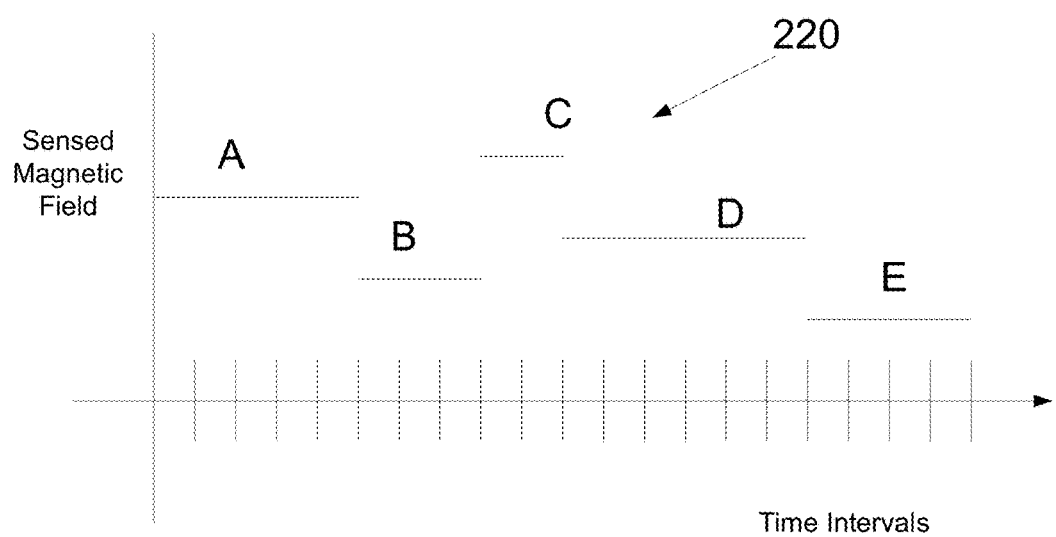
FIGURE 2

Intermittently receiving, by a wireless node (such as, wireless controller device 1530), a wireless signal from a vehicle sensing device, wherein the vehicle sensing device transmits the wireless signal upon sensing a change in vehicle occupancy of an associated parking location, wherein the wireless signal includes a vehicle sensing indicator, wherein the vehicle sensing indicator indicates whether the vehicle sensing device senses vehicle occupancy of the associated parking location

1610

Measuring a signal quality of the intermittently received wireless signal over time

1620

Correlating the measured signal quality of the intermittently received wireless signal over time with the vehicle occupancy indictor

1630

Identifying errors in the vehicle sensing indicator based on the correlating of the measured signal quality of the intermittently received wireless signal over time with the vehicle occupancy indictor

MONITORING VEHICLE PARKING OCCUPANCY

RELATED PATENT APPLICATIONS

This patent application is a continuation-in-part (CIP) of U.S. patent application Ser. No. 15/486,501 filed on Apr. 13, 2017, which is herein incorporated by reference.

FIELD OF THE EMBODIMENTS

The described embodiments relate generally to communication using magnetic fields. More particularly, the described embodiments relate to apparatuses, methods and systems for monitoring vehicle parking occupancy.

BACKGROUND

It can be difficult to communicate with a device within an RF shielded environment. For example, communication with an underground or underwater device can be difficult due to signal attenuation. Further, the device can be located in difficult to reach places making it hard to interact with the device.

It is desirable to have apparatuses, methods, and systems for triggering based on sensed changes to a magnetic field.

SUMMARY

An embodiment includes a method of monitoring vehicle parking occupancy. The method includes intermittently receiving, by a wireless node, a wireless signal from a vehicle sensing device, wherein the vehicle sensing device transmits the wireless signal upon sensing a change in vehicle occupancy of an associated parking location, wherein the wireless signal includes a vehicle sensing indicator, wherein the vehicle sensing indicator indicates whether the vehicle sensing device senses vehicle occupancy of the associated parking location. The method further includes measuring a signal quality of the intermittently received wireless signal over time, correlating the measured signal quality of the intermittently received wireless signal over time with the vehicle occupancy indictor, and identifying errors in the vehicle sensing indicator based on the correlating of the measured signal quality of the intermittently received wireless signal over time with the vehicle occupancy indictor.

Another embodiment includes a system for monitoring vehicle parking occupancy. The system includes a wireless node operative to intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location. Further, the wireless node measures a signal quality of the intermittently received wireless signal over time. The system further includes one or more network server interfaced with the wireless node through a network, wherein the one or more network servers are operative to correlate the measured signal quality of the intermittently received wireless signal over time with the vehicle occupancy indictor, and identify errors in the vehicle sensing indicator based on the correlating of the measured signal quality of the intermittently received wireless signal over time with the vehicle occupancy indictor.

Another embodiment includes a wireless node. The wireless node is operative to intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location. Further, the wireless node measures a signal quality of the intermittently received wireless signal over time, wherein one or more network server are interfaced with the wireless node through a network, and wherein the one or more network servers are operative to correlate the measured signal quality of the intermittently received wireless signal over time with the vehicle occupancy indictor, and identify errors in the vehicle sensing indicator based on the correlating of the measured signal quality of the intermittently received wireless signal over time with the vehicle occupancy indictor.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 shows sequences of sensed magnetic field deviations, according to an embodiment.

FIG. 16 is a flow chart of acts of a method of monitoring vehicle parking occupancy.

DETAILED DESCRIPTION

The described embodiments provide for apparatuses, methods, and systems for magnetic field event triggering. For an embodiment, the triggering includes at least one of an electronic wakeup, electronic unlocking, or a triggering of an event. An embodiment includes an apparatus that is located in a difficult to access location (such as, underground or underwater) wherein the apparatus is operative to sense a deviation in a magnetic field greater than a predetermined threshold, and trigger an event after sensing the deviation of the sensed magnetic field greater than the predetermined threshold. For an embodiment, the magnetic field is created by an object (such as a vehicle) that generates a magneto-static field which is sensed by the apparatus. For an embodiment, the magnetic field is generated and applied by an activation device. Accordingly, the activation device can be used for interfacing with the difficult to access apparatus.

For at least some embodiments, the magnetic field event triggering is utilized within a vehicle sensing device. For at least some embodiments, the vehicle sensing device determines or detects the presence of a vehicle. At least some embodiments include calibrating the vehicle sensing device without human interaction.

For at least some embodiments, sensing, by the apparatus, a sequence of specifically timed changes to the applied magnetic field provides the triggering. At least some embodiments include a secure switch or wake-up sensor.

For at least some embodiments, the sensed magnetic fields include magneto-static fields. A magneto-static field is a magnetic field in systems where the currents are steady (not changing with time). It is the magnetic analogue of an electrostatic field where the charges are stationary. The magnetization need not be static; the equations of magnetostatics can be used to predict fast magnetic switching events that occur on time scales of nanoseconds or less. Magnetostatics can be a good approximation of a magnetic field even when the currents are not static—as long as the currents do not alternate rapidly. Magnetostatics is widely used in applications of micromagnetics such as models of magnetic recording devices.

Figure 1:
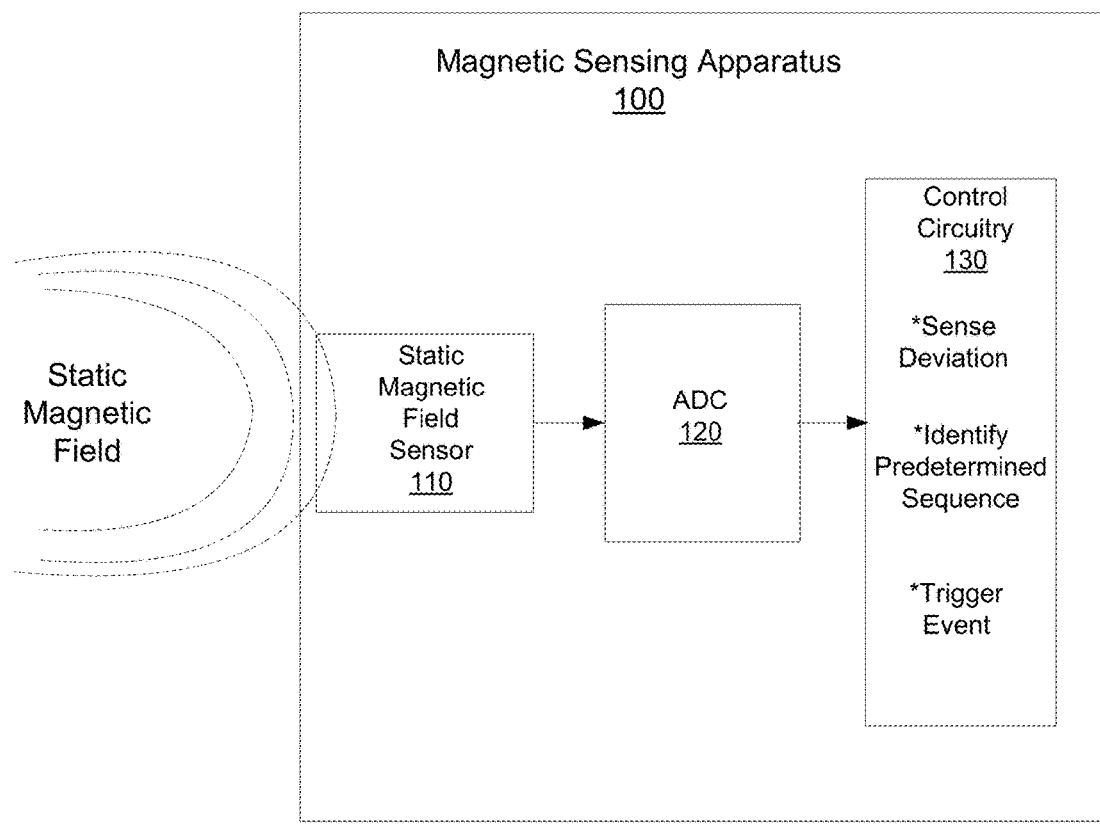
FIG. 1 shows a magnetic sensing apparatus, according to an embodiment.

FIG. 1 shows a magnetic sensing apparatus 100, according to an embodiment. The magnetic sensing apparatus includes a magnetic field sensor element 110, an ADC (analog to digital converter) 120, and control circuitry 130. The magnetic field sensor element 110 senses and applied magnetic field. For an embodiment, the ADC 120 samples the sensed magnetic field. The control circuitry 130 receives digital samples of the sensed magnetic field.

For at least some embodiments, the control circuitry 130 receives a representation (for example, the digital samples) of the sensed magnetic field, and senses deviations in the sensed magnetic field. The sensed variations include changes in the magnitude of the applied magnetic field of the greater than a threshold.

For at least some embodiments, the control circuitry 130 identifies a predetermined sequence of sensed deviations of the sensed magnetic field over a plurality of time intervals after sensing the deviation in the sensed magnetic field greater than the predetermined threshold.

For at least some embodiments, the control circuitry 130 triggers an event after identifying the predetermined sequence of sensed deviations of the sensed magnetic field over the plurality of time intervals.

For at least some embodiments, the magnetic field includes a drift. That is, the magnetic field is not absolutely static.

For an embodiment, the control circuitry 130 includes a controller. For an embodiment, the control circuitry 130 includes circuitry, such as, an FPGA (field programmable gate array), an ASIC (application specific integrated circuit), or other type of control circuitry. For an embodiment, the control circuitry 130 includes both a controller and other circuitry. For example, for an embodiment, the control circuitry 130 includes an ASIC that communicates magnetic sensing data and generates an interrupt signal when the sensed magnetic field exceeds a threshold. The interrupt wakes up a controller which can then receive the magnetic sensing data. This embodiment advantageously allows the high-power controller to only be activated when the sensed magnetic field exceeds the threshold while the lower-power ASIC performs the magnetic sensing operations.

For an embodiment, the magnetic field sensor element 110 includes a magnetic sensor. For an embodiment, the magnetic field sensor element 110 includes a magnetic sensor and some associated circuitry. For example, for an embodiment, the magnetic field sensor element 110 includes the magnetic sensor and the ADC 120. Further, for an embodiment, the magnetic field sensor element 110 includes the magnetic sensor, the ADC 120, and control circuitry, such as, an ASIC.

FIG. 2 shows sequences of sensed magnetic field deviations, according to an embodiment. That is, as stated, for at least some embodiment, the control circuitry 130 identifies a predetermined sequence of sensed deviations of the sensed magnetic field over a plurality of time intervals after sensing the deviation in the sensed magnetic field greater than the predetermined threshold. FIG. 2 shows such possible sequences. A first sequence 210 shows a series of sensed magnitude of a magnetic field have values of A, B, C, D, E. For an embodiment, specific sequences cause activation of the device. As described, the activation can include unlocking access, activating circuitry within the apparatus, or commanding the apparatus to perform an operation. Different sensed sequences can correspond to different actions performed by the apparatus. The second sequence includes the different sensed magnitudes remaining at specified levels for specified periods (changing) of time in order to cause a corresponding action by the apparatus.

Figure 3:
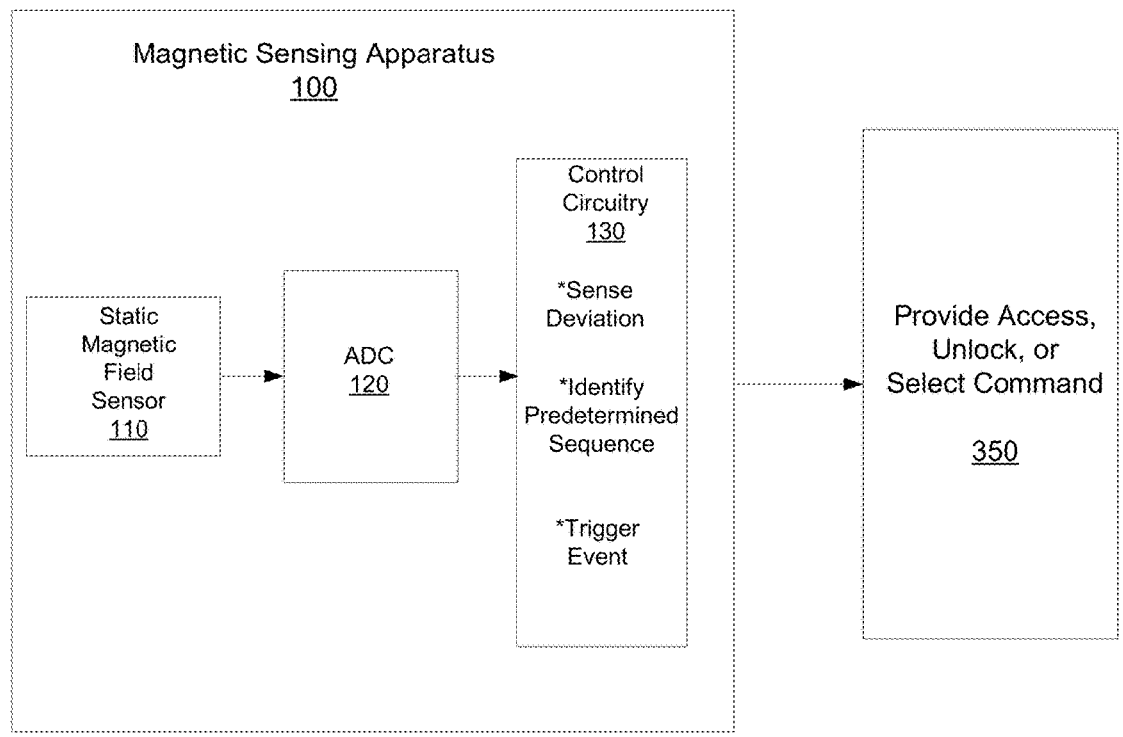
FIG. 3 shows a magnetic sensing apparatus which provide access, unlocks, or selects a command, according to an embodiment.

FIG. 3 shows a magnetic sensing apparatus which provide access, unlocks, or selects a command 350, according to an embodiment.

Figure 4:
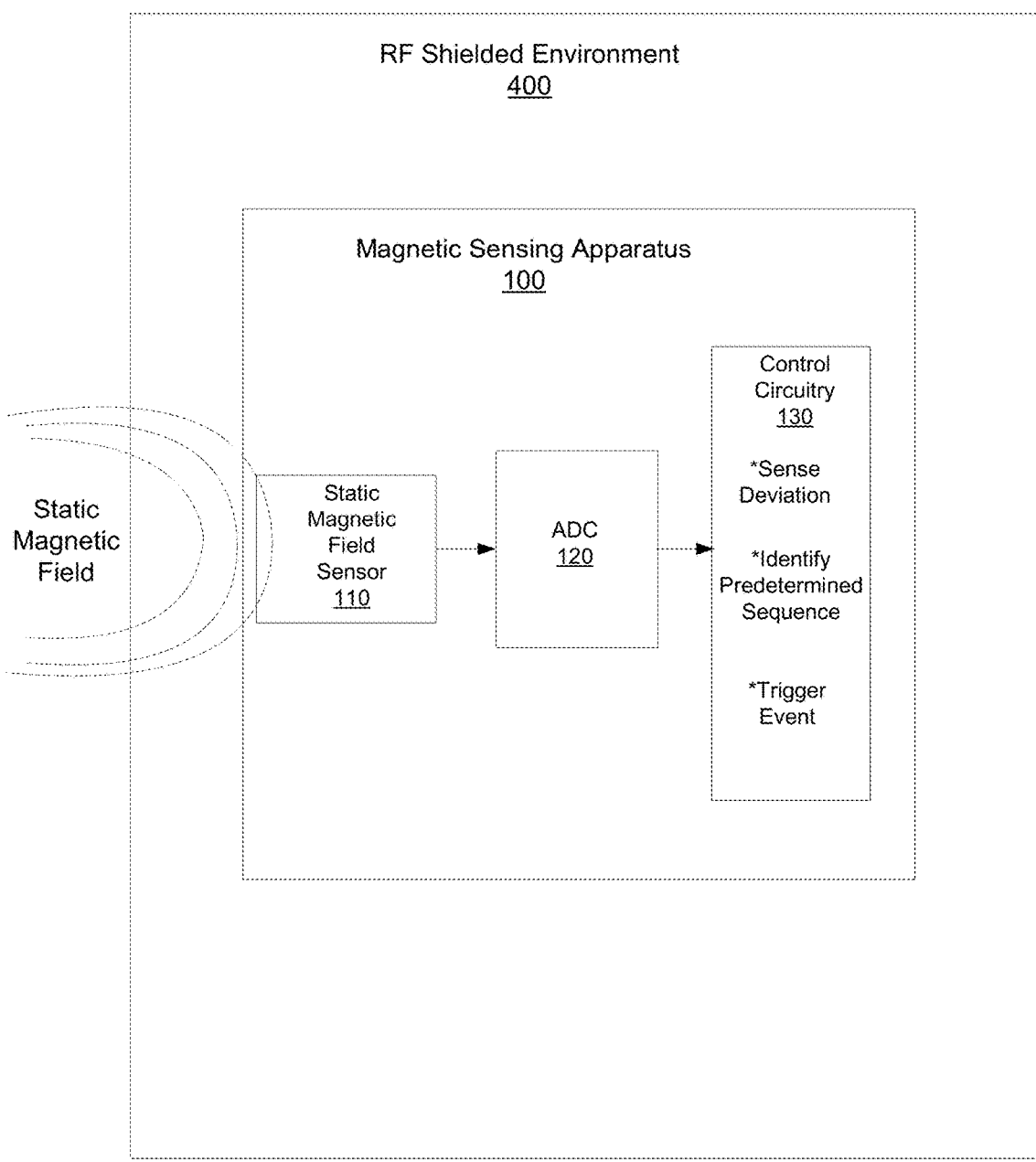
FIG. 4 shows a magnetic sensing apparatus within a shielded environment, according to an embodiment.

FIG. 4 shows a magnetic sensing apparatus within an RF shielded environment, according to an embodiment. That is, for an embodiment, the method of event triggering is operative in an RF (radio frequency) shielded environment. It is to be understood that the apparatus is further operative to operate in difficult to access environments, such as, underground or underwater.

Figure 5:
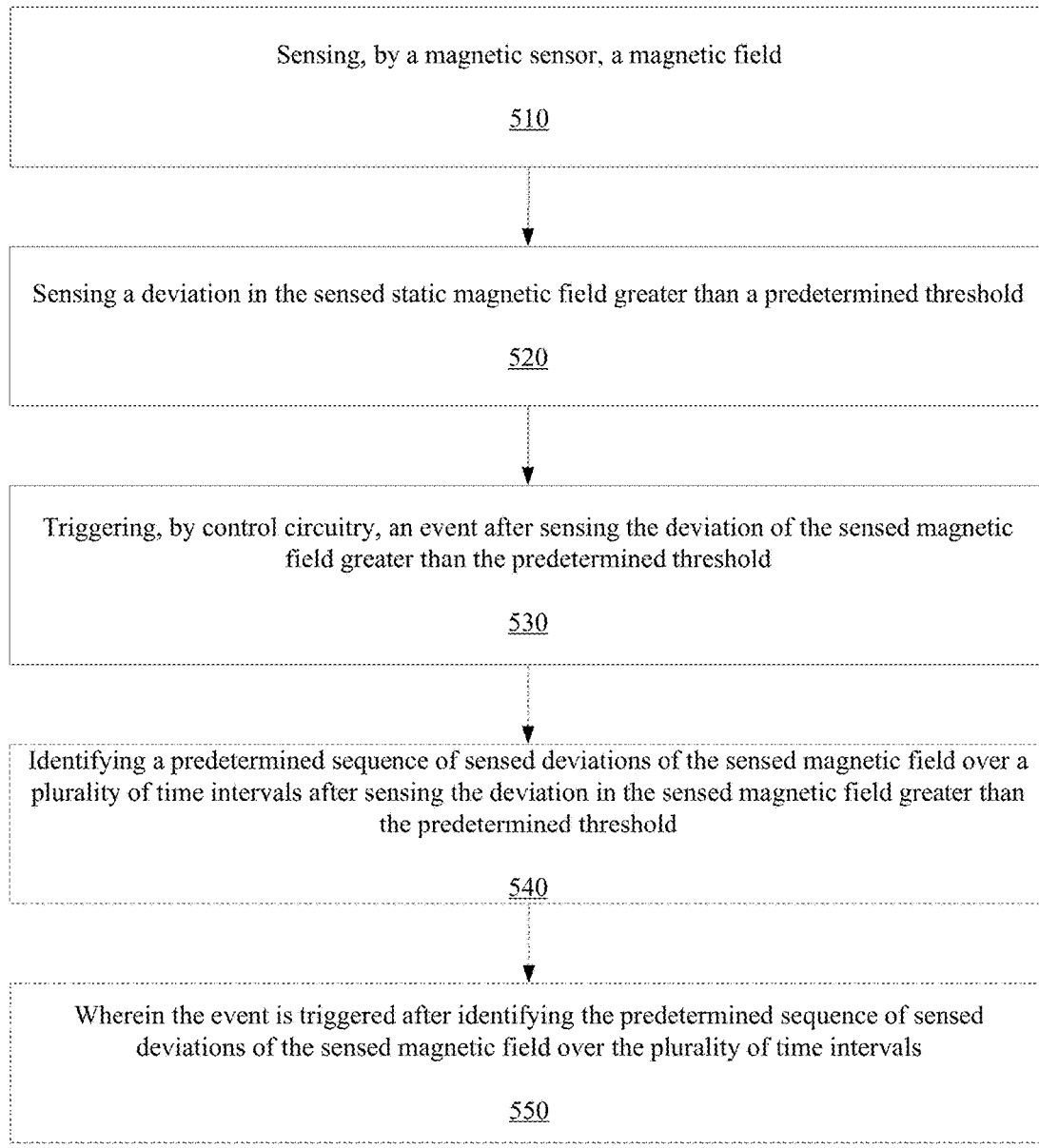
FIG. 5 is a flow chart that includes steps of a method of event triggering, according to an embodiment.

FIG. 5 is a flow chart that includes steps of a method of event triggering, according to an embodiment. A first step 510 includes sensing, by a magnetic sensor element, a magnetic field. A second step 520 includes sensing a deviation in the sensed magnetic field greater than a predetermined threshold. A third step 530 includes triggering, by control circuitry, an event after sensing the deviation of the sensed magnetic field greater than the predetermined threshold. An embodiment further includes a fourth step 540 that includes identifying a predetermined sequence of sensed deviations of the sensed magnetic field over a plurality of time intervals after sensing the deviation in the sensed magnetic field greater than the predetermined threshold. Further, a fifth step 550 includes the event being triggered after identifying the predetermined sequence of sensed deviations of the sensed magnetic field over the plurality of time intervals.

Figure 6:
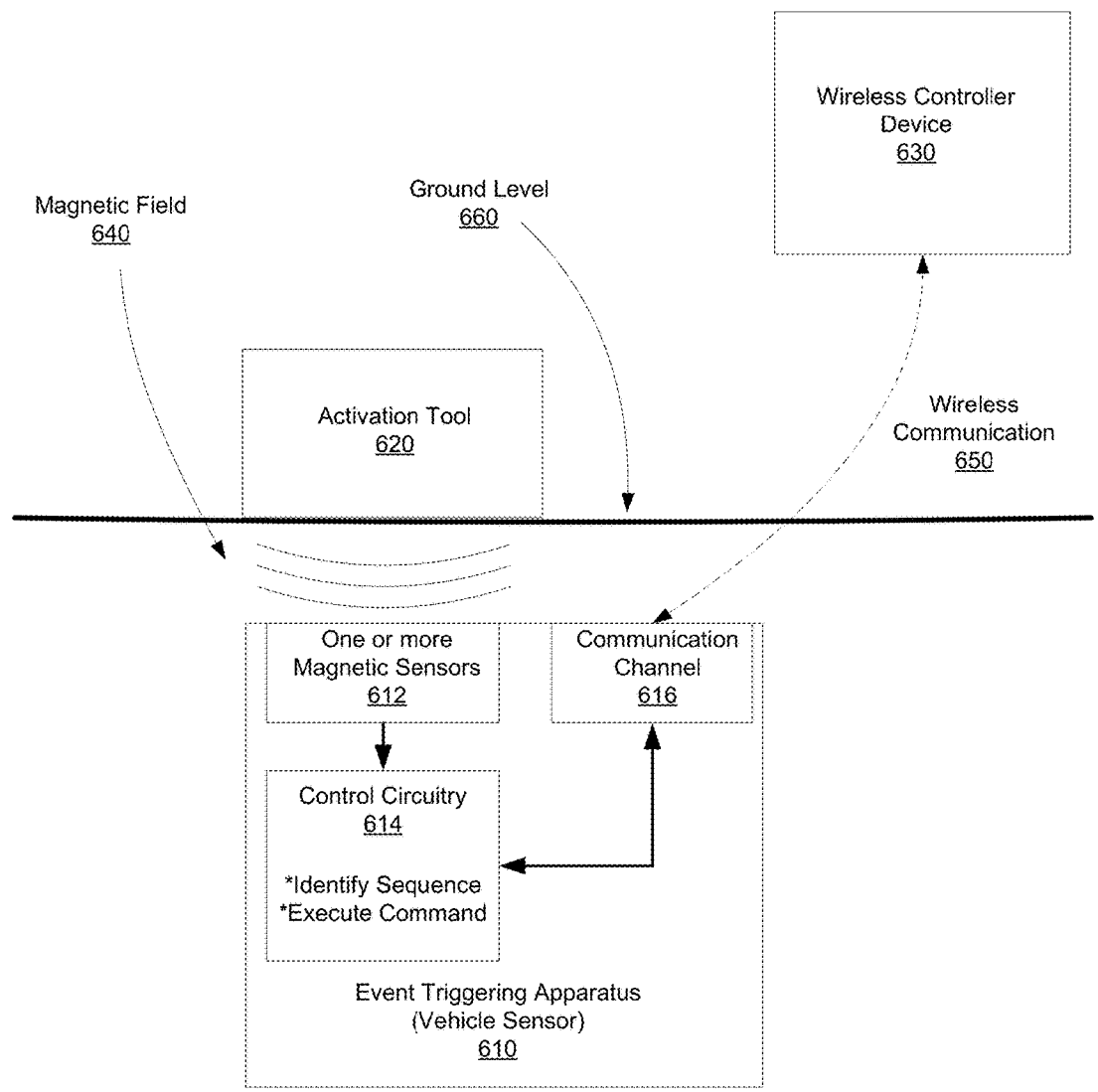
FIG. 6 shows a vehicle sensor apparatus and an activation tool, according to an embodiment.

FIG. 6 shows a vehicle sensor apparatus 610 (event triggering apparatus) and an activation tool 620, according to an embodiment. As shown, the vehicle sensor apparatus includes one or more magnetic sensors 612 for sensing a magnetic field. Further, control circuitry 614 monitors the sensed magnetic field and triggers an action based upon the sensed magnetic field satisfying a condition. For an embodiment, the condition includes a sensed deviation in the sensed magnetic field being greater than a predetermined threshold. For an embodiment, the condition further includes identifying a predetermined sequence of sensed deviations of the sensed magnetic field over a plurality of time intervals after sensing the deviation in the sensed magnetic field greater than the predetermined threshold.

As shown, for an embodiment, the activation tool 620 communicates with the vehicle sensor apparatus 610 through an applied magnetic field 640. Accordingly, the activation tool 620 can communicate with the vehicle sensor apparatus 610 when the vehicle sensor apparatus 610 is located in difficult to access environments, and environments that are RF shielded. As shown, the vehicle sensor apparatus 610 is located below ground level 660. For an embodiment, the vehicle sensor apparatus 610 is located underground for monitoring the presence or the lack of presence of a vehicle.

As shown, an embodiment of the vehicle sensor apparatus 610 includes a communication channel 616 which allows the vehicle sensor apparatus 610 to wirelessly communicate with a wireless controller device 630. Accordingly, sensing information or any other information of the vehicle sensor apparatus 610 can be uploaded to the wireless controller device 630 through the communication channel 650. The wireless controller device can be a mobile device or any other computing device, or a gateway that provides a connection between the vehicle sensor apparatus 610 and an upstream network, such as, the internet or cloud.

For at least some embodiments, the control circuitry 614 is operative to identify at least one of a plurality of predetermined sequences, and perform at least one of a plurality of commands based on the identification of the at least one of a plurality of predetermined sequences. For an embodiment, at least one of the plurality of commands includes activating electronic circuitry of the apparatus 610. For an embodiment, the command controls waking (powering) up portions of the control circuitry 614, or one or more other controllers of the apparatus 610. For an embodiment, the command controls activation of a high rate magnetic sensing. That is, first sense something of interest is sensed and the apparatus is activated. Once activated, the apparatus senses with greater sensitivity—which consumes more power. That is, only a minimal amount of circuitry within the apparatus 610 is activated to save power. If commanded, additional circuitry is activated. Accordingly, power used by the apparatus is used as needed in order for the apparatus 610 to properly operate, while conserving battery power. As previously stated, the apparatus can be placed in a difficult to reach environment, and therefore, conservation of a battery power is extremely important.

For an embodiment, at least one of the plurality of commands includes directing the apparatus to transition from a shipping mode to an operating mode, wherein the apparatus 610 consumes less power in the shipping mode than in the operating mode. That is, for an embodiment, the apparatus 610 is a contained device that is to be placed underground. Once underground, the apparatus 610 maintains a low-power operation unless conditions are determined that trigger the apparatus to activate at least portions of electronic circuitry of the apparatus.

Due to the apparatus 610 being deployed underground, for an embodiment, the apparatus is shipped from an apparatus producing company within a sealed package with no physical interface. For an embodiment, the predetermined threshold in the shipping mode is greater than the predetermined threshold in the operating mode. That is, for shipping, the predetermined threshold is set very high so that the apparatus does not activate when being shipped, and unnecessarily dissipate energy stored in the battery of the apparatus 610. After being shipped and after being deployed by being placed, for example, underground, for an embodiment, the apparatus is activated by, for example, by the activation tool 620 applying a magnetic field that includes a sequence that activates or commands the apparatus 610 to operate in a deployed mode or a non-shipping mode. As described, for an embodiment, the predetermined threshold is set very high in the shipping mode so that the device never activates, and then the predetermined threshold is lowered to an operating mode after being deployed, thereby allowing the apparatus to properly sense, for example, a vehicle proximate to the apparatus 610. That is, the shipping mode includes setting thresholds very high so that the device never wakes up before being deployed. Upon receiving a predetermined sequence, the thresholds are set for operational (non-shipping) mode.

For an embodiment, at least one of the plurality of commands includes directing the apparatus 610 to perform a hard reset of the apparatus. That is, for example, the activation tool 620 applies a magnetic field that includes a sequence that causes the apparatus 610 to completely reset and reboot. This is a very convenient means for resetting the apparatus 610 when the apparatus 610 is in a very difficult place to reach, such as, when placed underground.

For an embodiment, at least one of the plurality of commands includes directing the control circuitry 614 to be operative to receive a software update. As previously described, during deployment, the apparatus may be in a very difficult location for easy access, and power consumption of the apparatus 610 must be kept very low. Accordingly, for an embodiment, the activation tool 620 can apply a magnetic field with the proper sequence to cause the control circuitry 614 to put the apparatus 610 in a mode to receive a software update. The can include, for example, activating the communication channel 616 so that the apparatus 610 receives the software update from a mobile device, a gateway, or some other device through the wireless communication channel 650.

As previously described, for an embodiment, at least one of the plurality of commands includes activating one or more wireless communication channels of the apparatus. As previously described, for an embodiment, the activated one or more wireless communication channels are used to communicate with a gateway, wherein the gateway is connected to a network. As will be described, for an embodiment, the gateway is connected to the cloud (or any other type of network). When commanded, information is uploaded through the network to a cloud server. As will be described, for an embodiment, a plurality of apparatuses is connected to the cloud server or controller, and the cloud server or controller performs processing on information received from the vehicle sensing apparatus 610. While shown connected to a central server, it is to be understood that for an embodiment, different vehicle sensing apparatus are interconnected, and the controllers of the different vehicle sensing apparatus can perform distributed processing of information of the apparatuses.

For an embodiment, at least one of the plurality of commands includes directing the apparatus to transition from an operating mode to shipping mode.

For an embodiment, at least one of the plurality of commands includes directing the apparatus to transition from the default bootup mode to manufacturing mode. The default boot-up mode is typically the operating mode. The manufacturing mode sets the defines the networks keys for encrypting and decrypting uplink and downlink RF communications 650 for the communication channel 616 to a predetermined, secure IP address to the wireless controller device 630.

For an embodiment, the apparatus is further operative to provide an indication that the sensor of the apparatus is actively sensing a magnetic field. That is, for an embodiment, the magnetic sensor actively senses the magnetic field 640 once per a unit of time. For example, for an embodiment, the magnetic sensor senses the magnetic field 640 four times a second. For an embodiment, the apparatus 610 provides an indication of when the active sensing of the magnetic field 640 is occurring. For an embodiment, the magnetic sensor senses the magnetic field 640 once every other second when the vehicle sensor 610 is in shipping mode, thereby further saving power in shipping mode. The activation tool 620 can be used to confirm the vehicle sensor 610 was correctly placed into shipping mode by the activation tool 620 by sensing that the vehicle sensor 610 is actively sensing a magnetic field are a predefined magnetic sensor rate for shipping mode, such as 0.5 Hz. For an embodiment, providing an indication that the sensor of the apparatus is actively sensing a magnetic field comprises the apparatus generating a detectable magnetic field while the sensor is actively sensing the magnetic field.

For an embodiment, the indication that the sensor of the apparatus 610 is actively sensing a magnetic field, is used by an activation device 620 for synchronizing an applied magnetic field. That is, for an embodiment, the activation device 620 is operable to sense when the apparatus 610 is sensing the magnetic field 640. Accordingly, the activation device 620 can time or be synchronized when the activation device 620 applies the magnetic field 640. By synchronizing the applied magnetic field of the activation device 620 with timing of the sensing of the magnetic field by the apparatus, the sensing of sequences of magnetic field (as shown, for example, in FIG. 2) is more efficient and accurate.

For an embodiment, the apparatus includes a plurality of separate sensors, wherein the plurality of separate sensors generates a plurality of sensed magnetic fields, and wherein changes in a magnetic environment are detected based on the plurality of sensed magnetic fields. For an embodiment, the plurality of sensed magnetic fields is used to determine a magnetic gradient. The determined gradient indicates a change in magnetic field over a distance, wherein the distance between the sensors is known. Each sensor sensed a magnetic field, and the gradient determined. For an embodiment, the feature extractions from the sensed magnetic field can be used for estimating a speed of a sensed vehicle. For an embodiment, the sensed magnetic fields are uploaded to the gateway for processing. For an embodiment, the features extractions for the sensed magnetic field are uploaded to the gateway for processing. For an embodiment, the plurality of sensed magnetic fields can be used for correcting false positives in sensing the presence of a vehicle.

The detected changes in the environment can include, for example environmental factors that can cause false positives include changes to neighboring power lines, transient magnetic fields from passing trolleys or buses, and magnetic fields from vehicles from a neighboring parking space.

For an embodiment, the apparatus in conjunction with another apparatus is further operative to uniquely identify a vehicle. For an embodiment, arrays of sensors are used to identify vehicles. For an embodiment, a vehicle includes a device that aid in the identification of the vehicle—which is unique to the vehicle. Further, the identification can lead to a unique command. For example, identification of the vehicle can be used, for example, to activate the opening of a garage door or a gate based upon the identification of the vehicle.

For an embodiment, the magnetic field sensing is temperature compensated. For an embodiment, temperature compensation is applied to the raw magnetic sensor reading in the controller to enable the algorithms in the controller to process the signals with temperature compensated magnetic fields.

For an embodiment, the magnetic field sensing is calibrated for scale factor and offset. By calibrating for the local scale factor and offset of each apparatus, the magnetic field measured by the apparatus reports earth's geo-magnetic field, and thus when the measured magnetic field does not match the expected earth magnetic field, this information can be used to make algorithmic estimations such as vehicle speed or vehicle presence.

For an embodiment, the event triggering is operative in an RF (radio frequency) shielded environment.

As previously described, for an embodiment, the control circuitry 614 includes a controller. For an embodiment, the control circuitry 614 includes circuitry, such as, an FPGA (field programmable gate array), an ASIC (application specific integrated circuit), or other type of control circuitry. For an embodiment, the control circuitry 614 includes both a controller and other circuitry. For example, the control circuitry 614 includes an ASIC that communicates magnetic sensing data and generates an interrupt signal when the sensed magnetic field exceeds a threshold. The interrupt wakes up a controller which can then receive the magnetic sensing data. This embodiment advantageously allows the high-power controller to only be activated when the sensed magnetic field exceeds the threshold while the lower-power ASIC performs the magnetic sensing operations.

As previously described, for an embodiment, the one or more magnetic sensors 612 include a magnetic sensor. For an embodiment, the one or more magnetic sensors 612 include a magnetic sensor and some associated circuitry. For example, for an embodiment, the one or more magnetic sensors 612 include the magnetic sensor and an ADC. Further, for an embodiment, the embodiment, the one or more magnetic sensors 612 include the magnetic sensor, the ADC, and control circuitry, such as, an ASIC.

Figure 7:
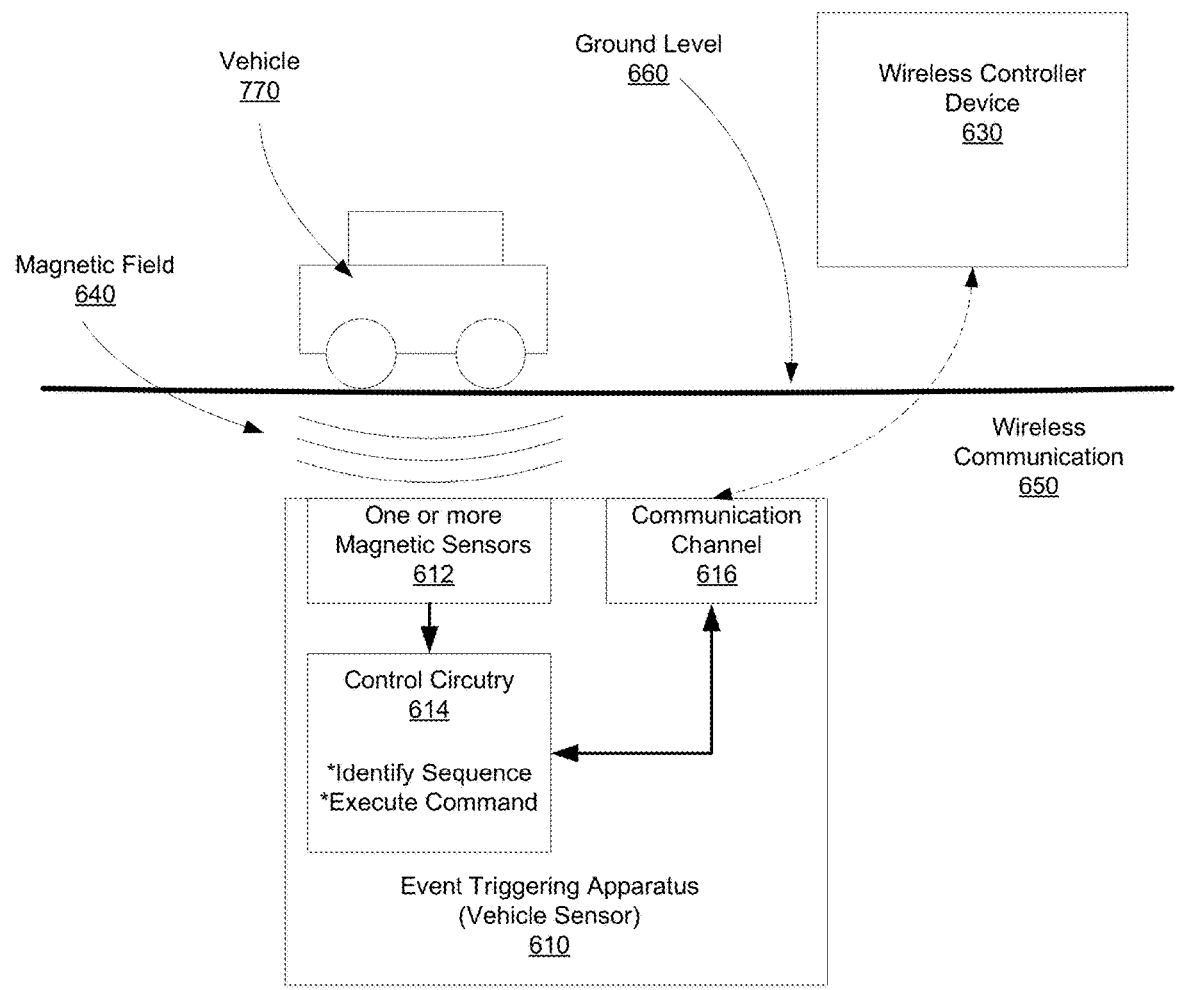
FIG. 7 shows a vehicle sensor apparatus sensing a vehicle, according to an embodiment.

FIG. 7 shows a vehicle sensor apparatus 610 sensing a vehicle 770, according to an embodiment. For this embodiment, the controller is further operative to detect a presence of the vehicle 770 based on sensing a signature of the sensed magnetic field that corresponds with the presence of the vehicle 770. That is, for an embodiment, the predetermined sequence sensed by the magnetic sensors 612 matches the signature of the sensed magnetic field of a vehicle being sensed.

For this embodiment, the control circuitry 614 is further operative to detect a speed of a vehicle 770 based on sensing a signature of the sensed magnetic field that corresponds with the speed of the vehicle. That is, for an embodiment, the predetermined sequence sensed by the magnetic sensors 612 matches the signature of the sensed magnetic field of the vehicle 770 at a particular speed.

For this embodiment, at least one of the plurality of commands includes directing the controller to provide selected information of the apparatus to the gateway. For an embodiment, the information includes the detection of the presence of a vehicle. That is, the predetermined sequence matches the signature that indicates the presence of a vehicle. The detected presence of the vehicle is communicated to the gateway.

For an embodiment, the apparatus includes a plurality of separate sensors, and the speed of a vehicle 770 is determined based on sensing one or more signatures of magnetic fields sensed by the separate sensors. By knowing the distance between the separate sensors of the apparatus, the speed of the vehicle 770 can be determined.

Introduction to an Embodiment of a Magnetic Field Sensor

Figure 8A:
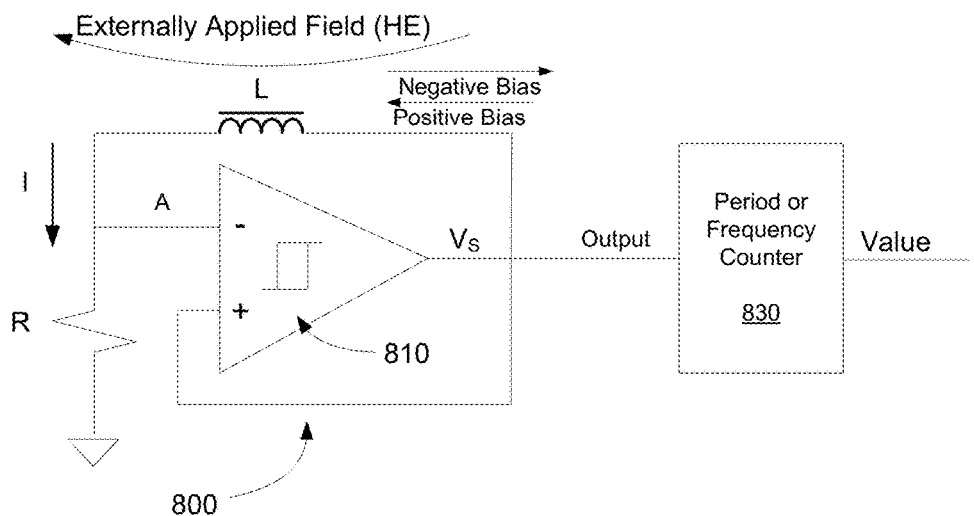
FIG. 8A shows an example of a magnetic field sensor that includes an oscillator, wherein a period of a signal generated by the oscillator is dependent upon an intensity of a sensed magnetic field.

FIG. 8A shows an example of a magnetic field sensor that includes an oscillator, wherein a period of a signal generated by the oscillator is dependent upon an intensity of a sensed magnetic field. The magnetic field sensor (magnetometer) that includes an oscillator 100, wherein a period of a signal generated by the oscillator 100 is dependent upon an intensity of a sensed external magnetic field. A frequency or period counter 130 receives an output signal of the oscillator. A value of an inductance L of the oscillator is dependent upon the intensity of the externally applied magnetic field. Therefore, the value at the output of the counter 130 is dependent upon the intensity of the externally applied magnetic field.

As shown, $H_E$ represents the external magnetic field parallel to the coil. The total magnetic field the sensor experiences, H, is a function of the external magnetic field and the magnetic field established by the current running through the circuit, I. This can be expressed as:

$$H = k_0 I + H_E$$

where $k_0$ is a constant that depends on certain physical parameters of the sensor.

Figure 8B:
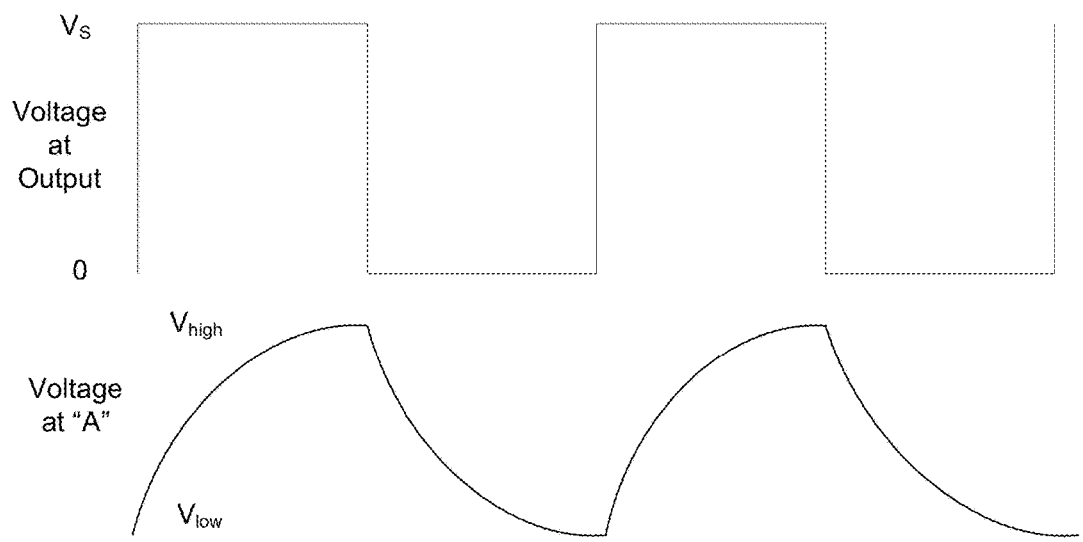
FIG. 8B shows an example of waveforms of the magnetic field sensor of FIG. 8A.

For the circuit of FIG. 8A, assuming a logical "0" value (0V or some value less than the trigger value) on an input to a Schmitt trigger 110, the Schmitt trigger yields an output value that is a logical "1" at some voltage $V_S$. This gradually drives up an input voltage across the sensor 800 until the voltage at (A) reaches a trigger threshold for the Schmitt Trigger, $V_H$. At this point, the Schmitt Trigger 810 detects the voltage at A as a logical "1", and the output of the Schmitt Trigger 810 becomes a logical "0". This drives the voltage down across the sensor 800, setting up an oscillation as depicted below in FIG. 8B. Note that the current, I, essentially mimics the voltage waveform at A. FIG. 8B shows an example of waveforms of the magnetic field sensor of FIG. 8A

For at least some embodiments, the magnetic field sensor 800 incorporates a solenoidal-geometry coil (L) wrapped around a high-permeability magnetic core. The sensor's permeability, varies with the applied magnetic field, and consequently, the sensor's inductance, L, is also a function of the magnetic field, H.

For the circuit depicted in FIG. 8A, the bias resistance, R, and drive voltage on the Schmitt Trigger 810 output ($V_S$) are selected such that the sensor's magnetic field is in the non-linear regime of the permeability curve.

Figure 9:
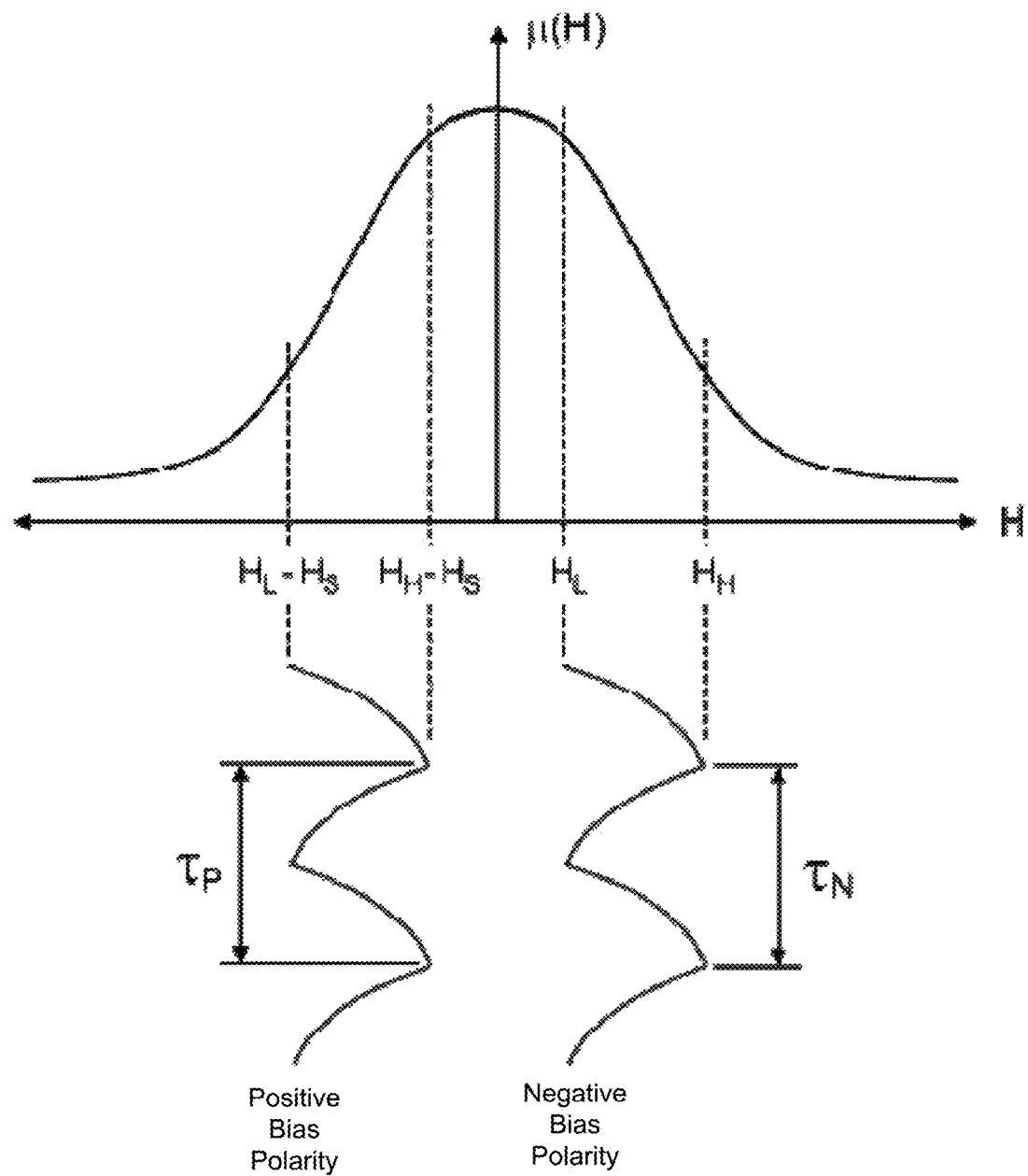
FIG. 9 shows examples of waveforms of a magnetic field sensor which is not exposed to an applied external field.

FIG. 9 shows examples of waveforms of a field sensor which is not exposed to an applied external field. That is, FIG. 9 depicts the voltage output when the circuit is driven with either a positive or negative bias (as depicted in FIG. 8A), but with no applied external magnetic field. Note that the period of oscillation is the same whether the circuit is positively or negatively biased.

Figure 10:
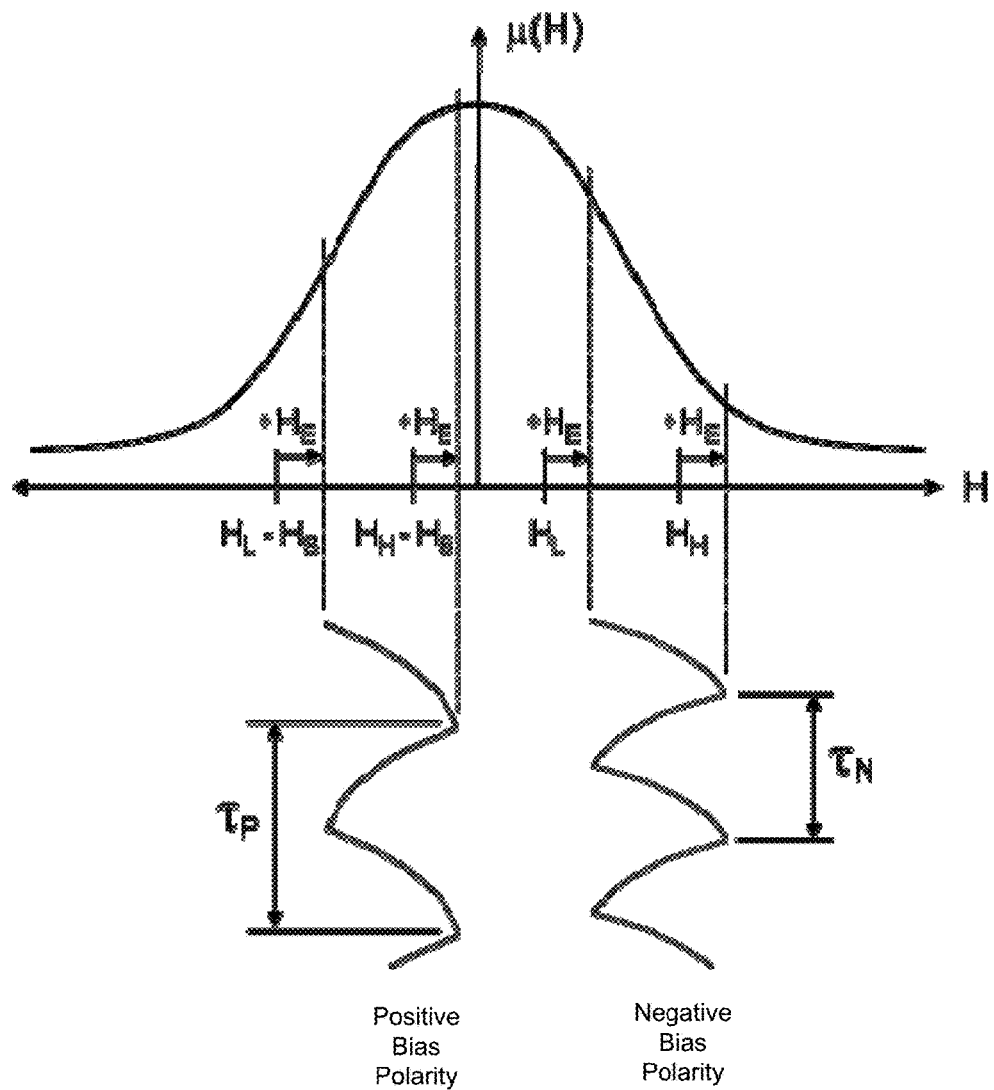
FIG. 10 shows examples of waveforms of a magnetic field sensor which is exposed to an applied external field.

When an external magnetic field is applied, $H_E$ (such as Earth's magnetic field), this causes both the positively and negatively biased curves to shift in the same direction. FIG. 10 shows examples of waveforms of a field sensor which is exposed to an applied external field. As depicted in FIG. 10, this shift causes the inductance to increase when the circuit is positively biased and to decrease when negatively biased. This, in turn, causes the period between cycles, τ, to increase for the positively biased circuit and decrease for the negatively biased circuit.

By measuring the time to complete a fixed number of oscillations (periods) that occur in the forward and reverse polarity directions and taking the difference between these two values, it is possible to derive the intensity and direction of the external magnetic field.

The magneto-inductive sensing of the sensor of FIG. 8A provides some particularly useful attributes that set it apart from other magnetic sensing technologies. More specifically the output value can be represented digitally. Most other technologies provide an analog output which can be used to derive the strength of the applied magnetic field by observing a change in voltage. In this case, noise either inherent in the circuit or from the surrounding effects the attainable resolution.

Figure 11:
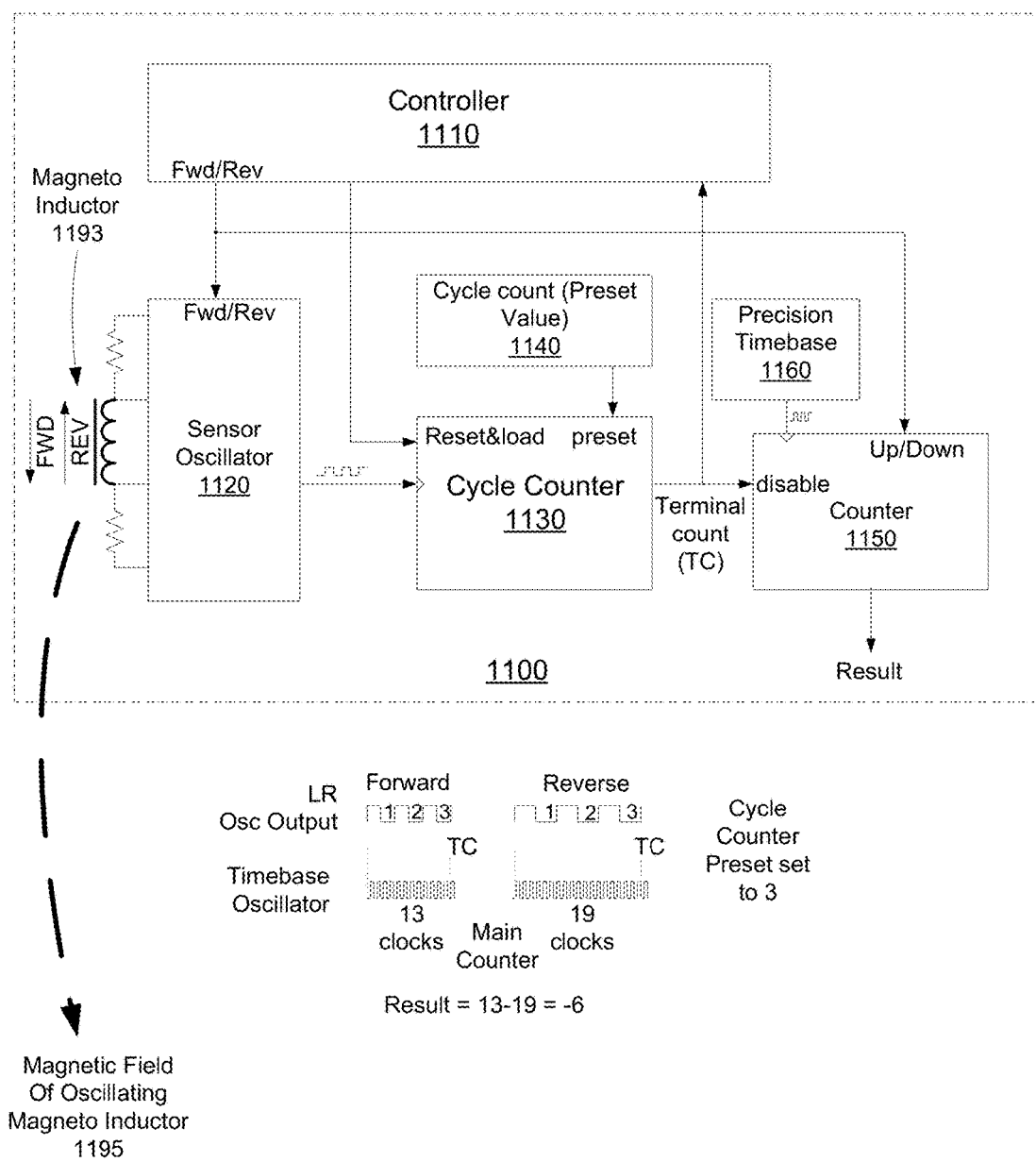
FIG. 11 shows an example of a magnetic field sensor that includes a pair of counters for providing a value representing an intensity and direction of a sensed magnetic field, according to an embodiment.

FIG. 11 shows an example of a magnetic field sensor 1100 that includes a pair of counters 1130, 1150 for providing a value representing an intensity and direction of a sensed magnetic field. The sensor 1100 includes a sensor oscillator 420 that can be similar in structure to the sensor of FIG. 8.

The sensor oscillator 1120 includes forward and reverse bias settings as controlled by a controller 1110. Basically, the controller 1110 sets a bias current through an inductor 1193 (for example, a solenoidal-geometry coil) in a forward direction (FWD) and in a reverse direction (REV). By determining the period and/or frequency variation of the output of the sensor oscillator for both the FWD and REV directions, the intensity and direction of the sensed magnetic field can be determined.

A cycle counter 1130 counts cycles of the output of the sensor oscillator up to a preset value as determined by a count cycle 1140. After the cycle counter 1130 has counted to the preset value, the cycle counter 1130 generates a terminal count (TC).

A counter 1150 times the period required for the cycle counter 1130 to generate a TC by counting a clock signal of a precision time-base 1160. That is, the counter 1150 is enabled and set to count (the clock signal) when the controller 1110 sets the sensor oscillator in, for example, the FWD direction. The counter 1150 is set to count up for one direction of the bias current, and set to count down for the other direction of the bias current. The result of the counter is dependent on the intensity of the applied magnetic field and the direction of the applied magnetic field. As shown in FIG. 11, an example of a preset value of the count cycle is 3. The counter 1150 counts the high-speed clock cycle over the duration of time it takes for the cycle counter 1130 to count 3 cycles of the output signal of the sensor oscillator 1120. The example of FIG. 11 shows the counter 1150 counting to 13 for the FWD bias, and counting down 19 for the REV bias, yielding a counter result of −6. This output (−6) provides an accurate representation of the intensity and direction of the sensed magnetic field.

The sensitivity of the magnetic sensor and sampler combination 1100 can be increased by increasing the value of the count cycle. That is, as the time period of the counting is increased, the sensitivity and signal to noise ratio (SNR) increases. However, at some point, the SNR of the sampled signal can no longer be improved due to the presence of 1/f noise of the sensor oscillator.

As previously described, the sensor oscillator 1120 includes forward and reverse bias settings as controlled by a controller 1110. Basically, the controller 1110 sets a bias current through the magneto inductor 1193 in a forward direction (FWD) and in a reverse direction (REV). By determining the period and/or frequency variation of the output of the sensor oscillator for both the FWD and REV directions, the intensity and direction of the sensed magnetic field can be determined. As described, the bias current of the magneto inductor 1193 only occurs while sensing the magnetic field by the sensor 1100. A magnetic field is naturally produced by the magneto inductor 1193 while the sensor oscillator 1120 is actively oscillating. Accordingly, the magneto inductor 1193 produces a magnetic field 1195 while the magnetic sensor 1100 is actively sensing. The magnetic field 1195 can be sensed by the activation device 620, thereby allowing the activation device 620 to synchronize the applied magnetic field of the activation device 620 with the magnetic sensing of the magnetic sensor 1100.

Figure 12:
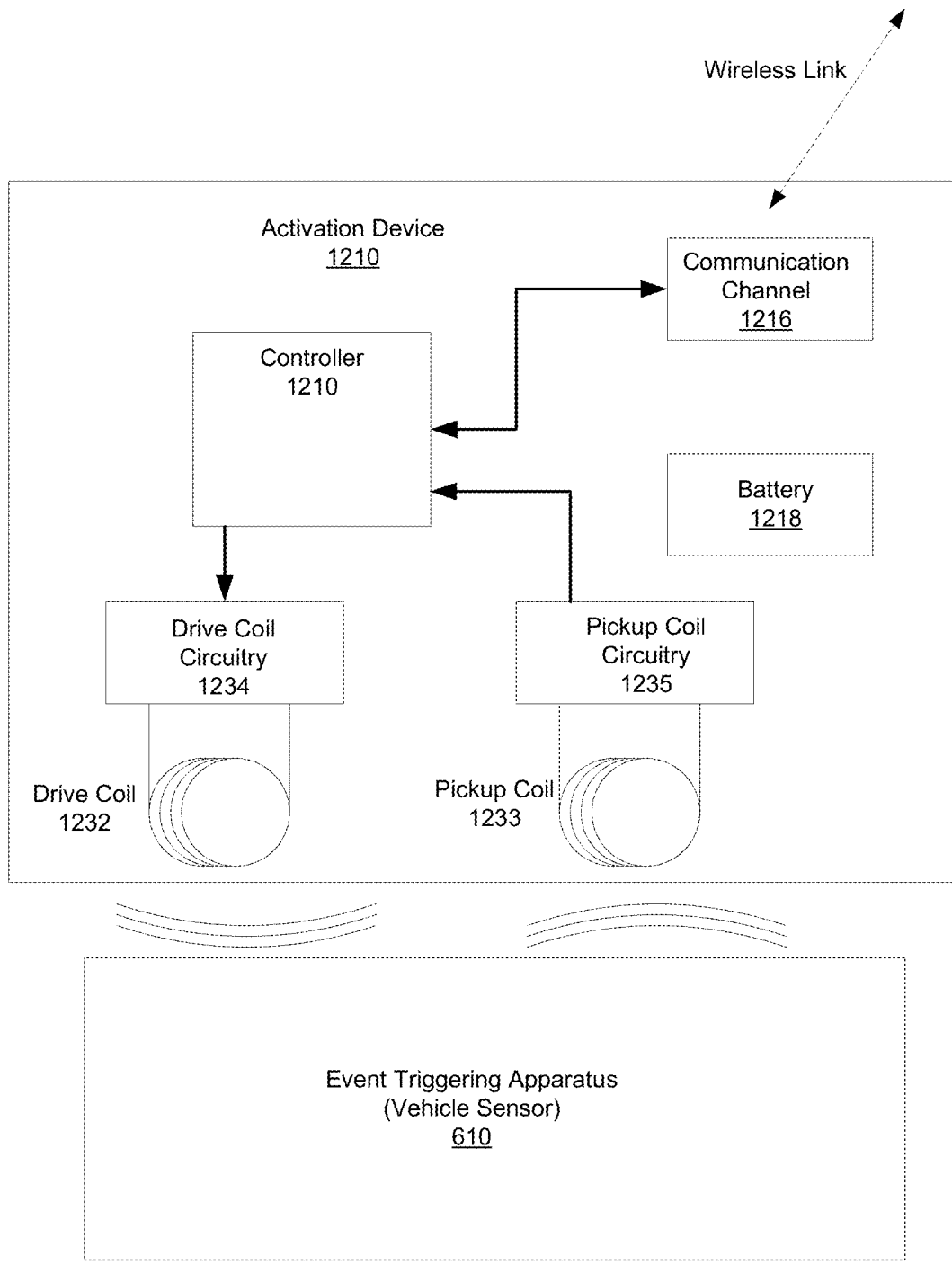
FIG. 12 shows an activation device, according to an embodiment.

FIG. 12 shows an activation device 1200, according to an embodiment. As shown, the activation device 1200 includes a drive coil 1232 which is operable to generate a magnetic field that is applied to, for example, the vehicle sensing apparatus 610. The applied magnetic field generated by the drive coil 1232 includes the sequences for commanding operation of the vehicle sensing apparatus 610.

As previously described, for an embodiment, the vehicle sensing apparatus 610 generates a magnetic field while the vehicle sensing apparatus 610 is sensing a magnetic field. For an embodiment, the pickup coil 1233 of the activation device 1200 is operable to sense the magnetic field generated by the vehicle sensing apparatus 610.

For at least some embodiments, a controller 1210 of the activation device 1200 controls drive coil circuitry 1234 and pickup coil circuitry 1235, and accordingly, synchronizes the applied magnetic field of the drive coil 1232 with the magnetic field sensed by the pickup coil 1233.

Figure 13:
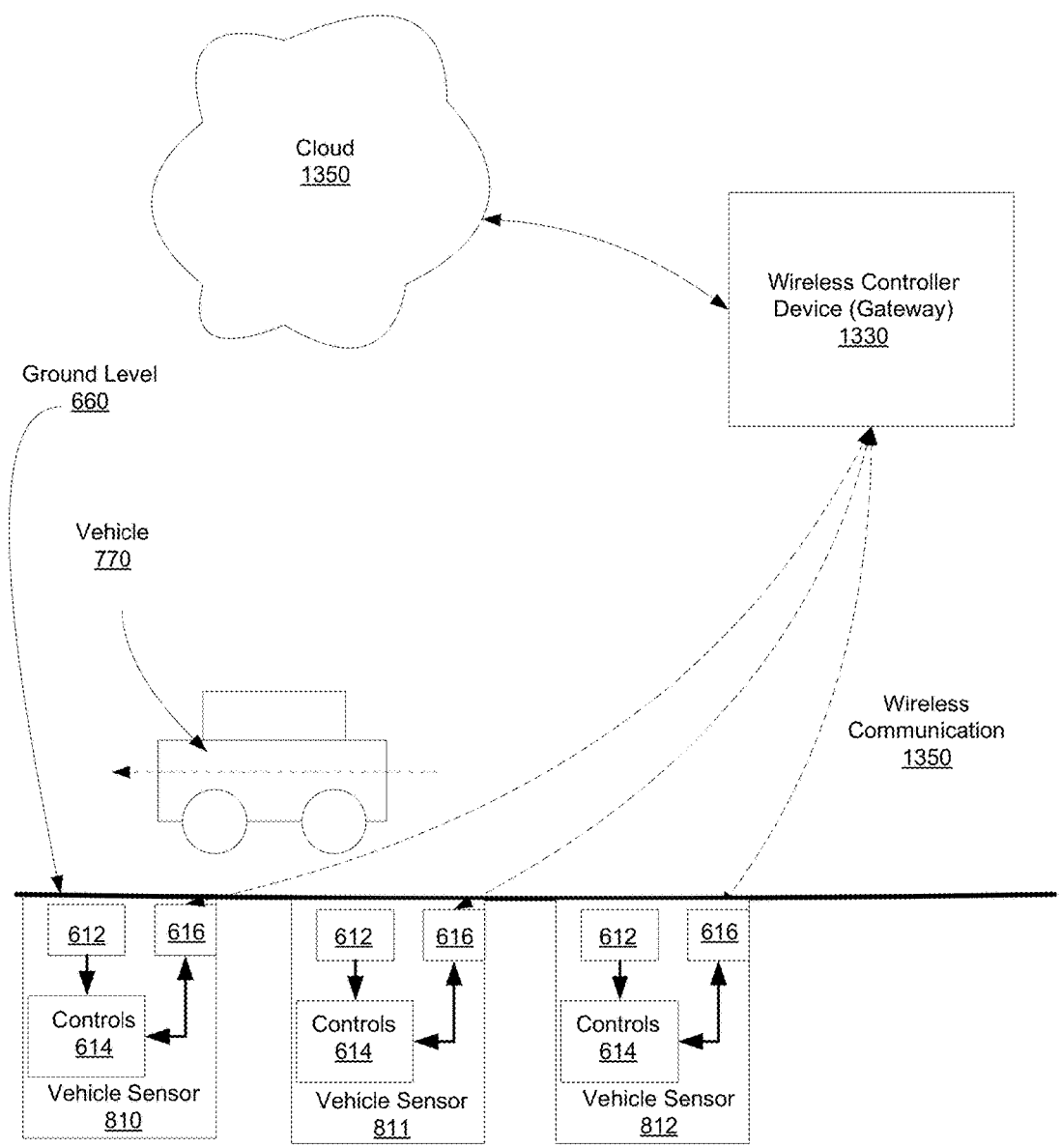
FIG. 13 shows an array of vehicle sensor apparatuses wirelessly connected to a gateway, according to an embodiment.

For at least some embodiments, the activation device 1200 is a mobile device that includes a battery 1218 and a wireless communication channel 1216. The wireless communication channel 1216 enables the activation device to interact with other mobile devices or a backend server. Accordingly, the activation device 1200 can receive instructions and/or information from other devices, and can provide instructions and/or information to other devices FIG. 13 shows an array of vehicle sensors wirelessly connected to a gateway, according to an embodiment. For an embodiment, each of the vehicle sensor apparatuses is place underground proximate to a parking location of a parking area. Accordingly, each sensor can monitor whether a parking location of the parking area is occupied or not. That is, if the parking location of a vehicle sensor apparatus is occupied, the vehicle sensor apparatus will sense through its magnet sensor a magnetic field that matches a signature that indicates the parking location is occupied. Further, if the parking location of the vehicle sensor apparatus is not occupied, the vehicle sensor apparatus will sense through its magnet sensor a magnetic field that does not match a signature that indicates the parking location is occupied.

Further, as described, a neighboring proximate vehicle sensor apparatus may be used to confirm a vehicle sensor apparatus properly senses a vehicle. That is, different types of vehicles will provide different magnetic field signatures. A particular large vehicle may possibly trigger a false positive with a neighboring vehicle sensor apparatus of a neighboring parking location. Other proximate vehicle sensor apparatus may be used to further confirm whether a vehicle is actually within the parking location of the vehicle sensor apparatus.

For an embodiment, multiple vehicle sensor apparatuses may be used for determining the speed of a vehicle. That is, by knowing the distance between neighboring vehicle sensor apparatuses and the timing in which each senses a vehicle, it is possible to estimate the speed of the vehicle.

As shown, the vehicle sensor apparatuses 810, 811, 812 are interfaced with a wireless device controller 1330 that wireless communication 1350 supported by the communication channels 616. The controller may be an upstream server or a cloud server, wherein a gateway provides access to the cloud server. For an embodiment, the vehicle sensor apparatuses 810, 811, 812 are at least partially controlled by the wireless device controller 1330. For an embodiment, the vehicle sensor apparatuses 810, 811, 812 provided sensed information to the wireless device controller 1330. Accordingly, the wireless device controller 1330 can coordinate control of the vehicle sensor apparatuses 810, 811, 812. Further, the wireless device controller 1330 collects and processes information of the vehicle sensor apparatuses 810, 811, 812.

Figure 14:
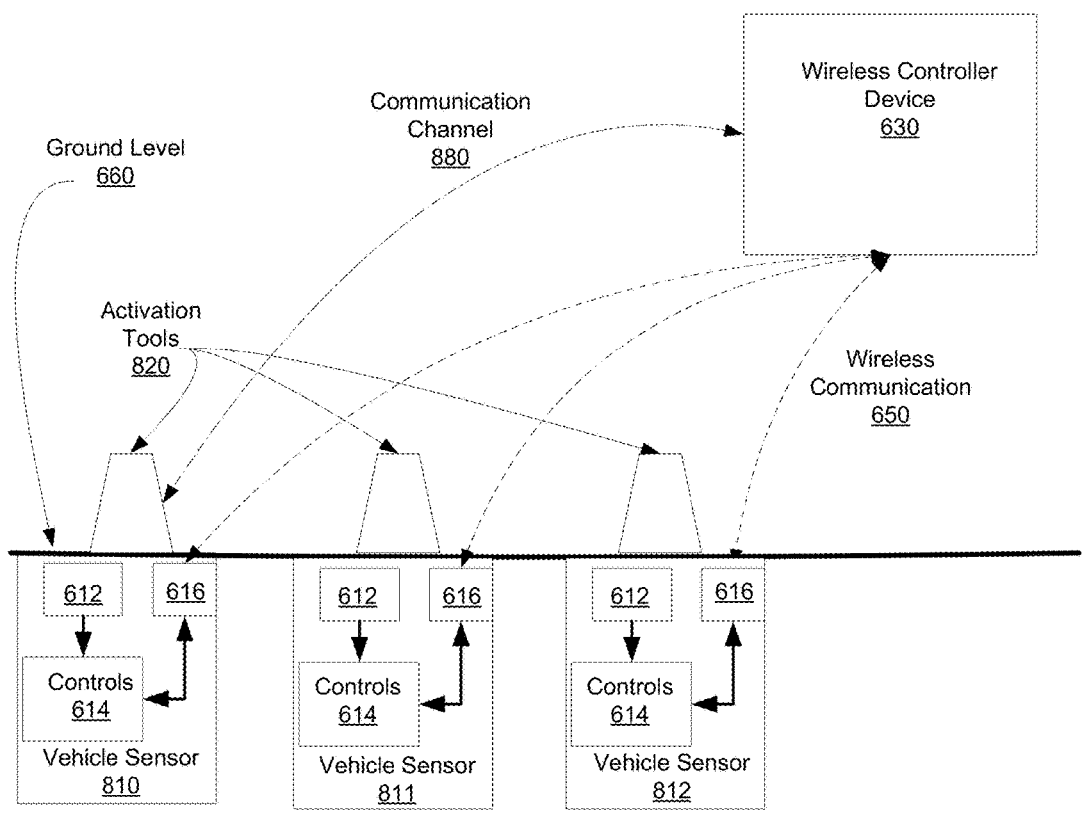
FIG. 14 shows an array of vehicle sensor apparatuses and activation devices wirelessly connected to a gateway, according to an embodiment.

FIG. 14 shows an array of vehicle sensor apparatuses and activation devices wirelessly connected to a gateway, according to an embodiment. For this embodiment, the wireless device controller 1330 can control and collect information from the vehicle sensors apparatuses 810, 811, 812, and can control and collect information from the activation tools 820. For an embodiment, the activation devices can take the form, for example, of orange cone that are place proximate to multiple different parking locations. Accordingly, the vehicle sensor apparatus for different parking locations can be activated by the activation tools 820. The activated vehicle sensor apparatuses can be instructed to provide information to the wireless controller device.

Figure 15:
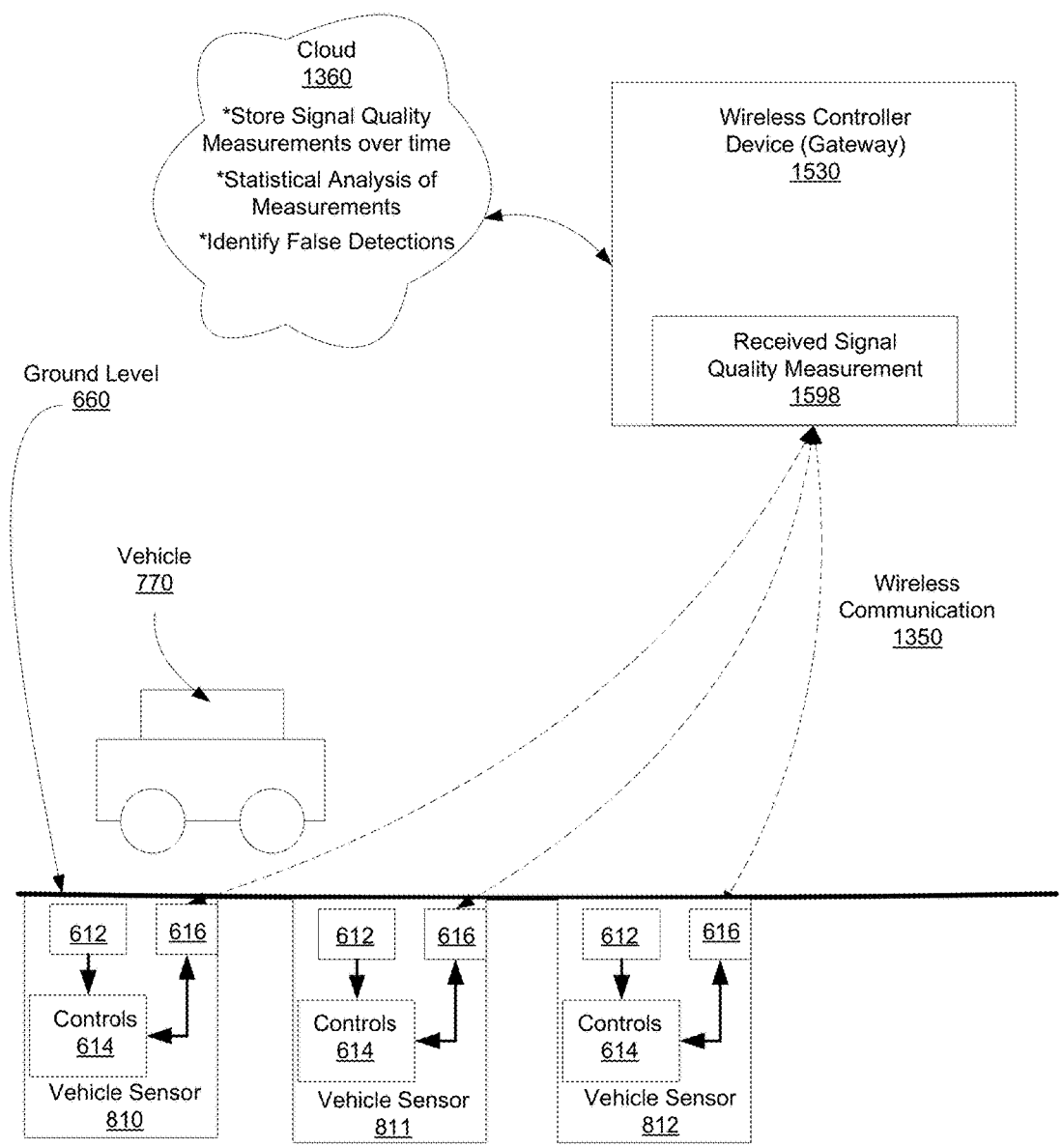
FIG. 15 shows an array of vehicle sensor apparatuses wirelessly connected to a gateway, wherein the gateway monitors a receive signal quality of wireless signals received from the vehicle sensor apparatuses, according to an embodiment.

FIG. 15 shows an array of vehicle sensors wirelessly connected to a gateway, wherein the gateway monitors a receive signal quality of wireless signals received from the vehicle sensors, according to an embodiment. For an embodiment, when a vehicle sensing apparatus 810, 811, 812 senses the presence of a vehicle 770, the vehicle sensing apparatus communicates the presence of the vehicle 770 to a wireless controller device 1530. For an embodiment, the wireless controller device 1530 includes a gateway that in connected through a network to the cloud 1360.

For an embodiment, when the wireless controller device 1530 receives a wireless signal from one of the vehicle sensor apparatuses 810, 811, 812, the wireless controller device 1530 measures or characterizes (1598) a signal quality of the received wireless signal. In some situations, the quality of the received wireless signal provides an indication of whether the parking location of the vehicle sensor apparatus is occupied or not. Accordingly, the wireless controller device 1530 can monitor the signal quality of the wireless signal received from a vehicle sensor apparatus over time. Therefore, if the wireless controller device 1530 sensed a deviation of the quality of the received wireless signal, the wireless controller device 1530 can detect that the vehicle sensor apparatus may have provided a false positive in the sensing of the presence of a vehicle.

For an embodiment, the quality of the received wireless signal includes at least one of a signal to noise ratio (SNR), a packet error rate (PER), a bit error rate (BER), a received signal strength (RSSI), or some other indicator of the quality of the received wireless signal. The presence of a vehicle may operate to attenuate wireless signal, and therefore, the signal quality is worse when a vehicle is present. The degradation of quality of the received wireless signal can be confirmed by the vehicle sensing apparatus.

In real-world situations, environmental conditions of the vehicle sensor apparatuses 810, 811, 812 may change such that the magnetic sensing loses accuracy. In these situations, the monitoring of the received wireless signals can be useful for detecting changes in the conditions.

As shown, the wireless controller device (gateway) 1530 is network connected to the cloud 1360. Further, for an embodiment, the wireless controller device (gateway) 1530 monitors the signal quality (1598) of wireless signals received from the vehicle sense apparatuses 810, 811, 812. For an embodiment, the vehicle sense apparatuses 810, 811, 812 activate upon sensing a vehicle. Therefore, the wireless controller device (gateway) 1530 measures the quality of the received wireless signal upon receiving one or more wireless signals from the vehicle sense apparatuses 810, 811, 812 that sense a vehicle. For an embodiment, the wireless controller device (gateway) 1530 provides both the indication of a sensed vehicle by the vehicle sensing apparatus and the quality of the wireless signal received from the vehicle sensing apparatus. By monitoring this information over time, false positives of the vehicle sensing can be determined. For at least some embodiments, the cloud 1360 processing further communicates the detected false positive to the corresponding vehicle sensing apparatus through the wireless controller device (gateway) 1530.

FIG. 16 is a flow chart of acts of a method of monitoring vehicle parking occupancy. A first step 1610 includes intermittently receiving, by a wireless node (such as, wireless controller device 1530), a wireless signal from a vehicle sensing device, wherein the vehicle sensing device transmits the wireless signal upon sensing a change in vehicle occupancy of an associated parking location, wherein the wireless signal includes a vehicle sensing indicator, wherein the vehicle sensing indicator indicates whether the vehicle sensing device senses vehicle occupancy of the associated parking location. A second step 1620 includes measuring a signal quality of the intermittently received wireless signal over time. A third step 1630 includes correlating the measured signal quality of the intermittently received wireless signal over time with the vehicle occupancy indictor. A fourth step 1640 includes identifying errors in the vehicle sensing indicator based on the correlating of the measured signal quality of the intermittently received wireless signal over time with the vehicle occupancy indictor.

For an embodiment, the correlating the measured signal quality of the intermittently received wireless signal over time with the vehicle occupancy indictor, and/or the identifying errors in the vehicle sensing indicator based on the correlating of the measured signal quality of the intermittently received wireless signal over time with the vehicle occupancy indictor are performed in the cloud 1360. However, for other embodiments at least portions of these acts occur at the wireless node and/or at the vehicle sensing device.

For an embodiment, measuring the signal quality comprises the vehicle sensing device transmitting a plurality of RF (radio frequency) packets and the wireless node measuring a received packet signal quality of the plurality of RF packets. For an embodiment, one of the plurality of RF packets includes information that indicates how many RF packets are to be measured to determine the received packet signal quality. That is, the measuring of the signal quality can require measuring an RF signal quality in a noisy environment. Due to the noise, the signal quality can be measured for a plurality of RF signal packets for each state transition of the detection of a vehicle or the detection of no vehicle. In normal operation, the RF signal power is desired to be as low as possible and still achieve reliable communication. However, when using the RF signal quality as a means to detect false positives for vehicle occupancy, it is desirable for the RF signal strength to be higher, or greater than a threshold level. For an embodiment, first RF signal packet includes extra information, including how many RF signal quality measurements (packets) are to be performed and the desired transmission power for these quality measurements. For this embodiment, the subsequent packets (such as, the $2^{nd}$, $3^{rd}$ and other packets) are a minimum (below a threshold) packet size.

For an embodiment, a plurality of wireless nodes intermittently receives the wireless signal. The plurality of wireless nodes generates a plurality of measured signal qualities of the wireless signal. Further, the plurality of measured signal qualities is correlated with the vehicle occupancy indicator. Errors in the vehicle sensing indicator are identified based on the correlation of the plurality of measured signal qualities with the vehicle occupancy indicator. That is, in addition to the wireless controller device (gateway) 1530 measuring the signal quality, a plurality of wireless controller devices measures the signal quality. Further, the correlation is performed between the multiple measured signal qualities and the vehicle occupancy indicator.

For an embodiment, identifying errors in the vehicle sensing indicator is determined by a server of an upstream network (such as, the cloud 1360), and wherein the upstream server further receives vehicle sensing indicators from neighboring vehicle sensing devices, and identifies whether a change in the vehicle sensing indicator was influenced by an occupancy change of a parking location associated with the neighboring vehicle sensing devices. That is, for an embodiment, errors are identified in the cloud 1360 (as opposed to at the wireless controller device (gateway or node)). Further, the errors are identified from a multimodal (multiple wireless controller device) point of view, which includes accounting for statuses of near neighbor nodes to see if the vehicle occupancy state change might have been due to a near neighbor (near neighbor parking location).

For an embodiment, the signal quality is measured (such as, 1598) at the wireless node (such as, wireless controller device 1530). For at least some embodiments, the measured signal quality includes at least one of SNR, RSSI, BER, PER, or SINR.

As previously suggested, for an embodiment, the wireless node is connected through a network to one or more cloud servers, and the one or more cloud servers perform the correlating and identifying.

An embodiment further includes communicating the identified errors in the vehicle sensing indicator back to the vehicle sensing device, thereby allowing the vehicle sensing device to correct its operation. As previously discussed, vehicle sensors can need to be recalibrated if the surrounding magnetic environment has changed, such as from a perming magnetic field. The communication of the correction of the operation can include a command to recalibrate the vehicle sensor. This is of particular importance, as this method eliminates the need to have other additional sensor technologies, such as cameras, or human-in-the-loop to confirm a parking space is empty prior to issuing a calibration command for the vehicle sensor. The errors can be identified in the cloud, or at an edge of the network, such as, at the wireless node (wireless controller device 1530).

An embodiment includes the wireless node queuing communication back to the vehicle sensing device until the wireless node receives an intermittent wireless signal that indicates the vehicle sensing device is active. That is, as described, for an embodiment, the vehicle sensing device is activated only upon sensing a change in occupancy of the associated parking location. Accordingly, the wireless node may not be able to complete communication with the vehicle sensing device when the wireless node has information (such as, an identified error in the vehicle sensing indicator). Therefore, an embodiment includes the wireless node holding (queuing) the communication within the wireless node, and transmitting the communication to the vehicle sensing device when the vehicle sensing device has been activated and is ready to receive the communication. For an embodiment, this includes the wireless node queuing and waiting to transmit the communication upon the wireless node receiving wireless communication (1350) (that is, the wireless signal) from the vehicle sensing device.

For an embodiment, the wireless signal received from the vehicle sensing device includes feature extractions from a sensed magnetic field of the vehicle sensing device. For an embodiment, the feature extractions are used to determine a confidence level in the vehicle occupancy indictor.

Feature extractions come from both a relative based and an absolute based magnetic field vehicle detection processing. For the relative based processing, a weighted moving average of the last several seconds' of magnetometer sensor data is used to quantify features foe the relative based algorithm. If this moving average value is larger than a pre-defined threshold, a parking event is detected and the status of the parking space will be changed based on previous status, like from vacant space to occupied or occupied space to vacant. If this moving average value is less than the pre-defined threshold, the status of the parking space will not be changed, kept the same as previous status. For the absolute variation based detection processing, a standard deviation value (STD) of the last several seconds' of magnetometer sensor data is used as a feature extraction. If this STD value is larger than a pre-defined threshold, a parking event is detected and the status of the parking space will be changed based on previous status. If this STD value is less than the pre-defined threshold, the status of the parking space will not be changed, and kept the same as previous status. Besides using STD value as feature to detect parking event, in this processing the following features are used to verify the parking space status, such as comparing the current magnetic field and last stored magnetic field when the space was vacant or the difference between current magnetic field and last stored magnetic field when the space was occupied. For an embodiment, one or more wireless nodes receive intermittent wireless signals from a plurality of vehicle sensing devices, and identifying errors in the vehicle sensing indicator is further based on feature extractions received from other vehicle sensing devices. For an embodiment, the other vehicle sensing devices includes neighboring vehicle sensing devices. An embodiment further includes processing, by cloud network servers, information of the plurality of vehicle sensing devices, and providing the processed information to services or applications that utilize the occupancy indicators.

As described, at least some embodiments are directed to a wireless node. Further, as described, the wireless node is operative to intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location. Further, the wireless node measures a signal quality of the intermittently received wireless signal over time, wherein one or more network server are interfaced with the wireless node through a network, and wherein the one or more network servers are operative to correlate the measured signal quality of the intermittently received wireless signal over time with the vehicle occupancy indictor, and identify errors in the vehicle sensing indicator based on the correlating of the measured signal quality of the intermittently received wireless signal over time with the vehicle occupancy indictor.

As described, at least some embodiments include a system for monitoring vehicle parking occupancy. As described, the system includes a wireless node operative to intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location. Further, the wireless node measures a signal quality of the intermittently received wireless signal over time. The system further includes one or more network servers interfaced with the wireless node through a network, wherein the one or more network servers are operative to correlate the measured signal quality of the intermittently received wireless signal over time with the vehicle occupancy indictor, and identify errors in the vehicle sensing indicator based on the correlating of the measured signal quality of the intermittently received wireless signal over time with the vehicle occupancy indictor.

Figure 17:
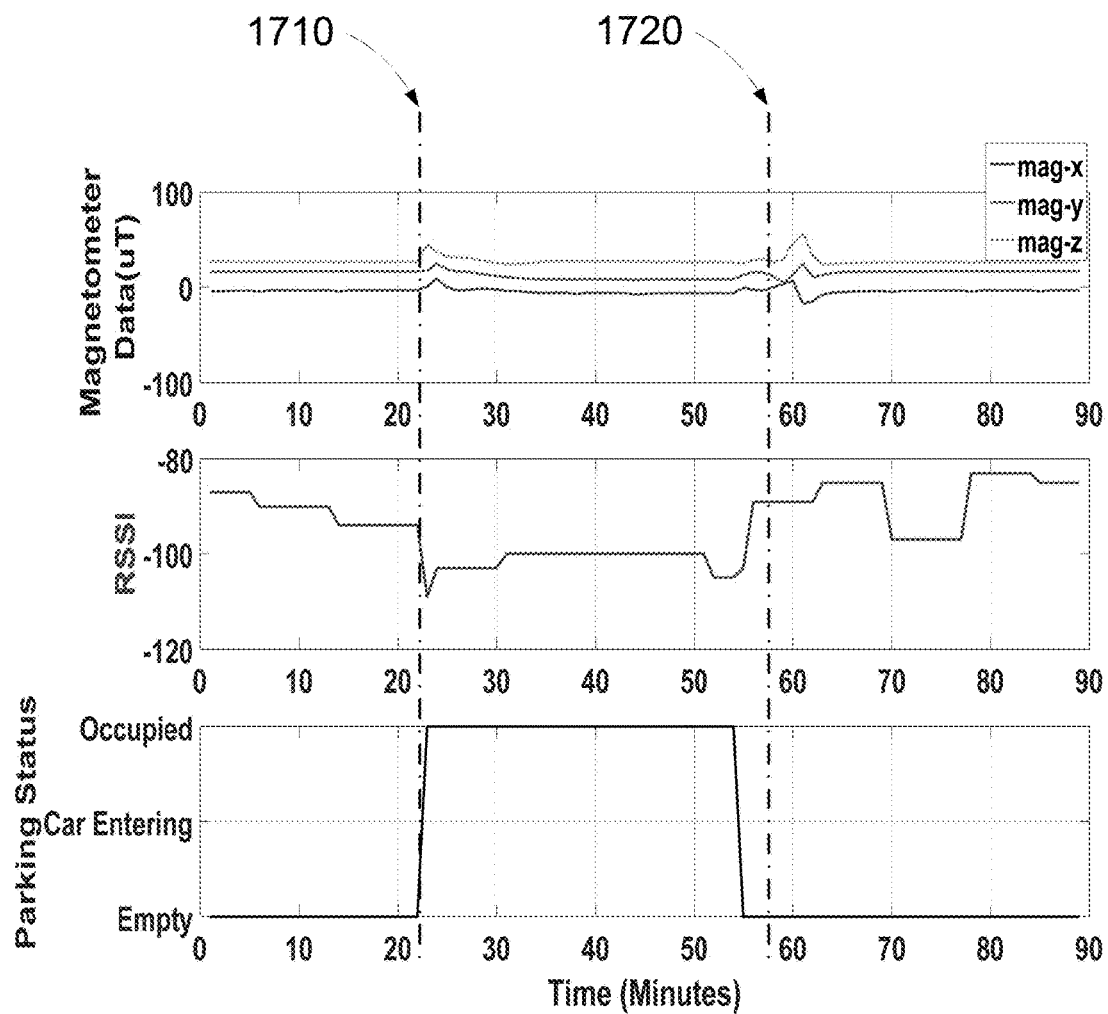
FIG. 17 shows time lines of a sensed signal of a magnetic sensor of a vehicle sensor apparatus, of a received signal quality of a wireless signal receive from the vehicle sensor apparatus, and a vehicle occupancy indictor, according to an embodiment.

FIG. 17 shows time lines of a sensed signal of a magnetic sensor of a vehicle sensor apparatus, of a received signal quality of a wireless signal receive from the vehicle sensor apparatus, and a vehicle occupancy indictor, according to an embodiment. The magnetic sensed data depicts deviations in the sensed magnetic field approximately at times 1710 and 1720, which indicate the detection of a vehicle occupying and not occupying (emptying) a location associated with the vehicle sensing device. As described, when the vehicle sensing device senses these changes in occupancy, the vehicle sensing device activates at least portions of circuitry of the vehicle sensing device, and transmits a wireless signal to the wireless node.

As shown by the signal quality measurement (RSSI (received signal strength indicator)) the magnitude of the RSSI measurement changes when the vehicle occupancy changes. For example, as shown in FIG. 17, the magnitude of the RSSI decreases when a vehicle is occupying the location associated with the vehicle sensing device, and is greater when the vehicle is not occupying the location associated with the vehicle sensing device. Again, the timing of the deviations in the RSSI occurs approximately at the times 1710 and 1720.

Further, the vehicle sensing indicator as depicted in FIG. 17 by the parking status indicate the location associated with the vehicle sensing device is occupied between the times 1710, 1720.

The wireless node and/or an upstream network (such as, the cloud) can correlate the RSSI with the magnetic sense data and the vehicle sensing indicator to determine how the RSSI correlates with the vehicle occupancy. Therefore, when a change to the environment surrounding the vehicle sensing device occurs which changes the sensed magnetic fields, the sensed or measured RSSI signal can be used to sense the change, and therefore, subsequent inaccuracies of the vehicle sensing status. Once an error in the vehicle sensing indicator is determined by observing inconsistencies between the received signal quality measurements and the indicated vehicle sensing indicator, the error can be communicated to the vehicle sensing device so that the vehicle sensing device can update and correct its operation.

Figure 18:
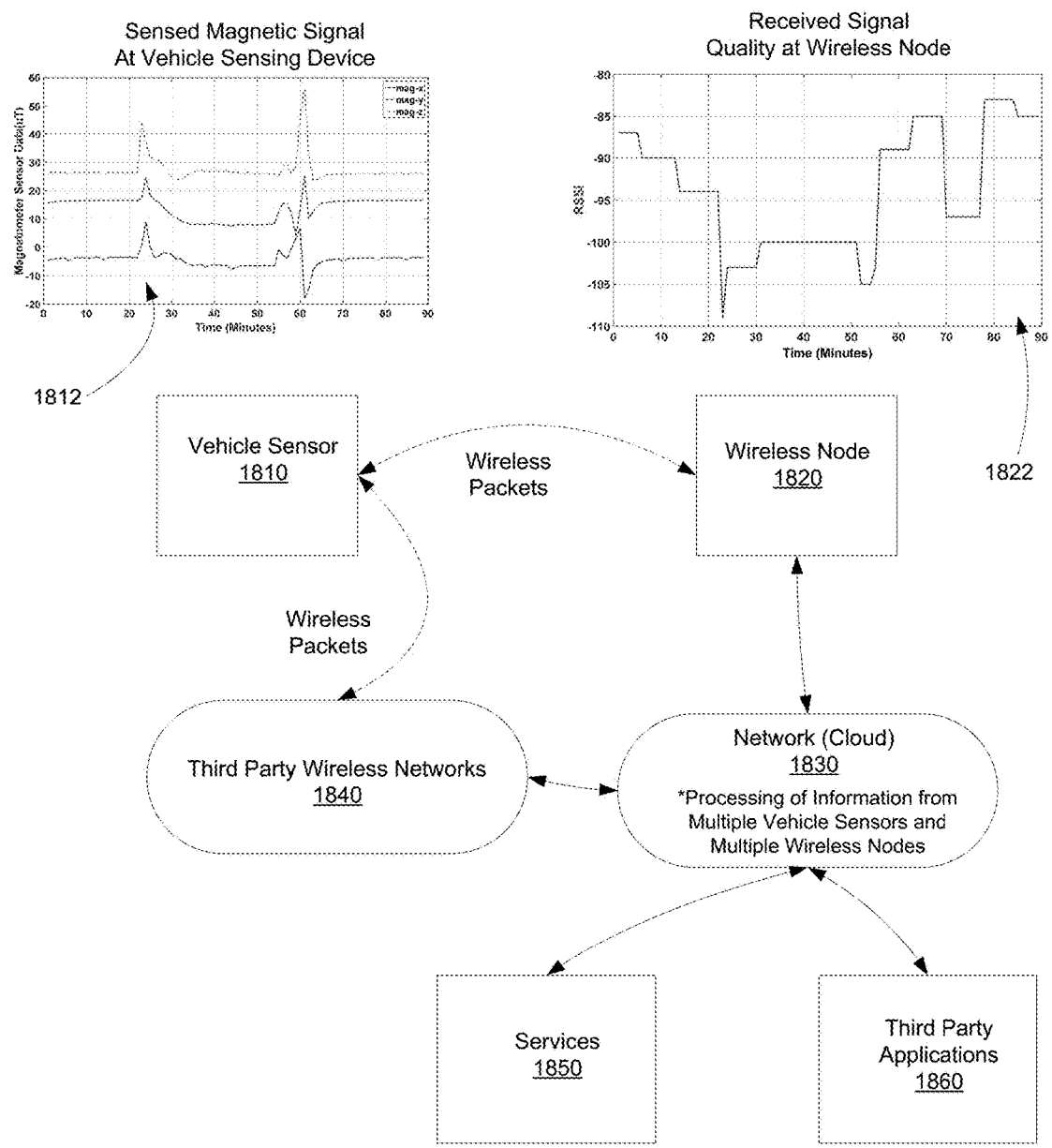
FIG. 18 shows an embodiment of a cloud-based multiple wireless node vehicle occupancy sensing system, according to an embodiment.

FIG. 18 shows an embodiment of a cloud-based multiple wireless node vehicle occupancy sensing system, according to an embodiment. As shown, for this embodiment, a vehicle sensor 1810 senses occupancy of an associated location by sensing a magnetic field 1812. As shown, by the plot 1812, the magnetic sensing can include x, y, and z components.

When the vehicle sensor 1810 senses an occupancy change of the location as determined through variations in the sensed magnet fields, the vehicle sensor 1810 transmits a wireless signal (wireless packets) to a wireless node 1820. As previously described, for at least some embodiments the wireless node 1820 measures a signal quality of the received packets. Plot 1822 shows an example of the received signal quality of the received packets.

For an embodiment, at least one of the wireless node 1820 or an upstream network (the cloud) 1830 correlates an occupancy indicator (or the lack of) received by the wireless node 1820 with the received signal quality. Accordingly, the received signal quality can be used in the future as a comparative reference for determining whether the occupancy indicator provided by the vehicle sensor 1810 is incorrect due to influences of the environment of the vehicle sensor 1810. For example, the vehicle sensor 1810 will know if the currently measured magnetic field when no car is present matches the historical magnetic field when no car is present. When these values do not match within a predefined limit, the received signal quality of the RF can be used to determine if there is or is not a car present. Influences of the environment of the vehicle sensor 1810 can come from a nearby car, or could occur from other influences such as a magnetized car rim or even a street sweeper that could cause magnetic hysteresis in the vehicle sensor, or it's battery.

Third party network operators are deploying commercially available M2M solutions using Low Power Wide Area Networks, such as Ingenu, Weightless W, N, and P, LoRaWAN, NB-IoT, and Sigfox. For at least some embodiments, the network 1830 is further interfaced with third party wireless networks 1840, services 1850, and/or third party applications 1860.

As previously described, at least some embodiments include calibrating the vehicle sensor 1810 without human interaction. For at least some embodiments, the cloud 1830 initiates a calibration command, which is propagated to the vehicle sensor 1810 through the wireless node 1820. For at least some embodiments, the vehicle sensor 1810 periodically or intermittently wakes up, and receives the calibration command that is within a queue of the wireless node 1820. Upon receiving the calibration command, the vehicle sensor 1810 transmits a wireless signal which the wireless node 1820 receives, and the wireless node 1820 measures a quality of the received wireless signal as RFQ1. The vehicle sensor 1810 then performs a calibration in which the vehicle sensor 1810 senses a magnetic field which can be used for determination of occupancy of an associated parking location. The vehicle sensor 1810 again transmits another wireless signal that includes information related to the sensed magnetic field. The wireless node 1820 again measures the quality of the received wireless signal as RFQ2. A comparison of the RFQ1 and RFQ2 determines whether the calibration based on the sensed magnetic field is valid. That is, for example, the occupancy of the associated parking location may have changed between the timing of the measurement of RFQ1 and RFQ2, and therefore, the calibration may be invalid. The validity of the calibration can be confirmed by determining that RFQ1 is approximately equal to RFQ2.

Although specific embodiments have been described and illustrated, the described embodiments are not to be limited to the specific forms or arrangements of parts so described and illustrated. The embodiments are limited only by the appended claims.

What is claimed:

1. A method of monitoring vehicle parking occupancy, comprising:
   intermittently receiving, by a wireless node, a wireless signal from a vehicle sensing device, wherein the vehicle sensing device transmits the wireless signal upon sensing a change in vehicle occupancy of an associated parking location, wherein the wireless signal includes a vehicle sensing indicator, wherein the vehicle sensing indicator indicates whether the vehicle sensing device senses vehicle occupancy of the associated parking location;
   measuring a signal quality of the intermittently received wireless signal over time;
   correlating the measured signal quality of the intermittently received wireless signal over time with the vehicle occupancy indictor; and
   identifying errors in the vehicle sensing indicator based on the correlating of the measured signal quality of the intermittently received wireless signal over time with the vehicle occupancy indictor.

2. The method of claim 1, wherein measuring the signal quality comprises the vehicle sensing device transmitting a plurality of RF (radio frequency) packets and the wireless node measuring a received packet signal quality of the plurality of RF packets.

3. The method of claim 2, wherein one of the plurality of RF packets includes information that indicates how many RF packets are to be measured to determine the received packet signal quality.

4. The method of claim 1, further comprising a plurality of wireless nodes intermittently receiving the wireless signal, wherein the plurality of wireless nodes generate a plurality of measured signal qualities of the wireless signal, wherein the plurality of measured signal qualities are correlated with the vehicle occupancy indicator, and wherein errors in the vehicle sensing indicator are identified based on the correlation of the plurality of measured signal qualities with the vehicle occupancy indicator.

5. The method of claim 1, wherein identifying errors in the vehicle sensing indicator is determined by a server of an upstream network, and wherein the upstream server further receives vehicle sensing indicators from neighboring vehicle sensing devices, and identifies whether a change in the vehicle sensing indicator was influenced by an occupancy change of a parking location associated with the neighboring vehicle sensing devices.

6. The method of claim 1, wherein the signal quality is measured at the wireless node.

7. The method of claim 1, wherein the wireless node is connected through a network to one or more cloud servers, and the one or more cloud servers perform the correlating and identifying.

8. The method of claim 1, further comprising communicating the identified errors in the vehicle sensing indicator back to the vehicle sensing device, thereby allowing the vehicle sensing device to correct its operation.

9. The method of claim 8, further comprising the wireless node queuing communication back to the vehicle sensing device until the wireless node receives an intermittent wireless signal that indicates the vehicle sensing device is active.

10. The method of claim 1, wherein the wireless signal received from the vehicle sensing device includes feature extractions from a sensed magnetic field of the vehicle sensing device.

11. The method of claim 10, wherein the feature extractions are used to determine a confidence level in the vehicle occupancy indictor.

12. The method of claim 1, wherein one or more wireless nodes receive intermittent wireless signals from a plurality of vehicle sensing devices, and identifying errors in the vehicle sensing indicator is further based on feature extractions received from other vehicle sensing devices.

13. The method of claim 12, further comprising processing, by cloud network servers, information of the plurality of vehicle sensing devices, and providing the processed information to services and applications.

14. A system for monitoring vehicle parking occupancy, comprising:
a wireless node operative to:
   intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location; and
   measure a signal quality of the intermittently received wireless signal over time;
one or more network server interfaced with the wireless node through a network, the one or more network servers operative to:
   correlate the measured signal quality of the intermittently received wireless signal over time with the vehicle occupancy indictor; and
   identify errors in the vehicle sensing indicator based on the correlating of the measured signal quality of the intermittently received wireless signal over time with the vehicle occupancy indictor.

15. The system of claim 14, wherein measuring the signal quality comprises the vehicle sensing device transmitting a plurality of RF (radio frequency) packets and the wireless node measuring a received packet signal quality of the plurality of RF packets.

16. The system of claim 15, wherein one of the plurality of RF packets includes information that indicates how many RF packets are to be measured to determine the received packet signal quality.

17. The system of claim 14, wherein the wireless node is further operative to communicate the identified errors in the vehicle sensing indicator back to the vehicle sensing device, thereby allowing the vehicle sensing device to correct its operation.

18. The system of claim 17, wherein the wireless node is further operative to queue communication back to the vehicle sensing device until the wireless node receives an intermittent wireless signal that indicates the vehicle sensing device is active.

19. The system of claim 14, wherein the wireless signal received from the vehicle sensing device includes feature extractions from a sensed magnetic field of the vehicle sensing device.

20. A wireless node, wherein the wireless node is operative to:
   intermittently receive a wireless signal from a vehicle sensing device, wherein the vehicle sensing device transmits the wireless signal upon sensing a change in vehicle occupancy of an associated parking location, and includes a vehicle sensing indicator within the wireless signal, wherein the vehicle sensing indicator indicates whether the vehicle sensing device senses vehicle occupancy of the associated parking location; and
   measure a signal quality of the intermittently received wireless signal over time;
   wherein one or more network server are interfaced with the wireless node through a network, and wherein the one or more network servers are operative to:
   correlate the measured signal quality of the intermittently received wireless signal over time with the vehicle occupancy indictor; and
   identify errors in the vehicle sensing indicator based on the correlating of the measured signal quality of the intermittently received wireless signal over time with the vehicle occupancy indictor.

* * * * *